US011932045B2

(12) United States Patent
Kim

(10) Patent No.: US 11,932,045 B2
(45) Date of Patent: Mar. 19, 2024

(54) NON-SLIP ASSEMBLY FOR BINDER CLIP

(71) Applicant: Chun Ki Kim, Gyeonggi-do (KR)

(72) Inventor: Chun Ki Kim, Gyeonggi-do (KR)

( * ) Notice: Subject to any disclaimer, the term of this patent is extended or adjusted under 35 U.S.C. 154(b) by 0 days.

(21) Appl. No.: 18/268,193

(22) PCT Filed: Nov. 1, 2021

(86) PCT No.: PCT/KR2021/015547
§ 371 (c)(1),
(2) Date: Jun. 16, 2023

(87) PCT Pub. No.: WO2022/131530
PCT Pub. Date: Jun. 23, 2022

(65) Prior Publication Data
US 2024/0042789 A1 Feb. 8, 2024

(30) Foreign Application Priority Data
Dec. 17, 2020 (KR) ........................ 10-2020-0177543
May 10, 2021 (KR) ........................ 10-2021-0060182
May 10, 2021 (KR) ........................ 10-2021-0060183

(51) Int. Cl.
*B42F 1/00* (2006.01)
*B43K 23/00* (2006.01)

(52) U.S. Cl.
CPC ............ *B42F 1/006* (2013.01); *B43K 23/001* (2013.01)

(58) Field of Classification Search
CPC .............................. B42F 1/006; B43K 23/001
See application file for complete search history.

(56) References Cited

U.S. PATENT DOCUMENTS 4,524,992 A * 6/1985 Linn .......................... B42F 9/00 281/35
5,950,283 A * 9/1999 Sato ........................ B42F 1/006 24/67.5

(Continued)

FOREIGN PATENT DOCUMENTS

JP 2008-80505 4/2008
JP 2014-73641 4/2014

(Continued)

OTHER PUBLICATIONS

International Search Report for PCT/KR2021/015547 dated Mar. 23, 2022 and its English translation from WIPO (now published as WO 2022/131530).

(Continued)

*Primary Examiner* — Jason W San

(57) ABSTRACT

An embodiment of the present invention provides a non-slip assembly for a clip device, capable of securely holding documents and having various conveniences in use. Here, the non-slip assembly for a clip device is detachable from the clip device which comprises a clip device body having a pair of pressing ends, bent to have therein an insertion space, in which documents are inserted therein, and which press the documents while being narrowed or closed up by elastic restoration force; and a pair of handles, attached/linked to a handle inserting inlet formed on the clip device body, and pressed so that the clip device body is widened; and the non-slip assembly includes a non-slip unit and an affixing portion. The non-slip unit is formed in a flexible material having elasticity and frictional force, and has a non-slip band, arranged between the pressing ends to come in contact with the documents inserted in the insertion space, and which is/are pressed by the pressing end(s) to prevent slipping on/with the inserted documents. The affixing portion is provided in a pair on both-end portions of the non-slip (Continued)

unit, and are inserted in the handle inserting inlets to couple the non-slip unit to the clip device body.

12 Claims, 26 Drawing Sheets

(56) References Cited

U.S. PATENT DOCUMENTS

D472,457 S * 4/2003 Fenton ........................... D8/394
7,120,969 B2 * 10/2006 Carls ....................... B42F 1/006 24/558
D667,885 S * 9/2012 Wang ............................. D19/65
D667,886 S * 9/2012 Wang ............................. D19/65
9,199,506 B2 * 12/2015 Lim ....................... B42F 1/006
9,446,620 B1 * 9/2016 Safar ....................... B42F 1/006
10,081,214 B1 * 9/2018 Cuadrado ............... B42F 1/006
2003/0115722 A1 * 6/2003 Shogbamimu .......... B42F 1/006 24/67.5
2015/0306898 A1 * 10/2015 Joyner .................... B42F 1/006 24/67.9
2015/0342313 A1 * 12/2015 Antinone .................. B42F 1/08 24/67.7
2016/0091866 A1 * 3/2016 Jersa, III ................. B42F 1/006 368/278
2017/0120664 A1 * 5/2017 Klein ...................... F16B 2/245
2017/0157975 A1 * 6/2017 Jang .......................... B42F 1/10
2017/0259611 A1 * 9/2017 King ......................... G09F 3/16
2018/0065398 A1 * 3/2018 Lim ........................ B42F 1/006
2018/0184771 A1 * 7/2018 Antinone ............. A45C 11/182
2018/0245612 A1 * 8/2018 Despres .................. B42F 1/006
2019/0016172 A1 * 1/2019 Matsushita ............. B42F 1/006

FOREIGN PATENT DOCUMENTS

KR 10-2016-0086451 7/2016
KR 10-2021-0103927 8/2021

OTHER PUBLICATIONS

Written Opinion of the International Searching Authority for PCT/KR2021/015547 dated Mar. 23, 2022 and its English translation by Google Translate (now published as WO 2022/131530).

* cited by examiner

[FIG. 1]
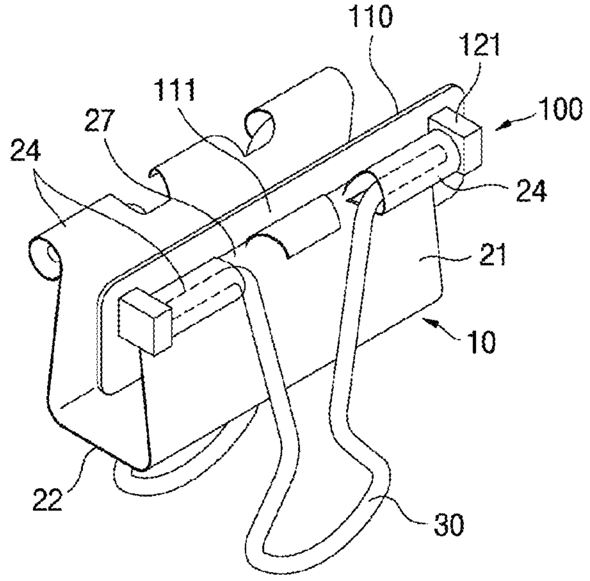
(a)
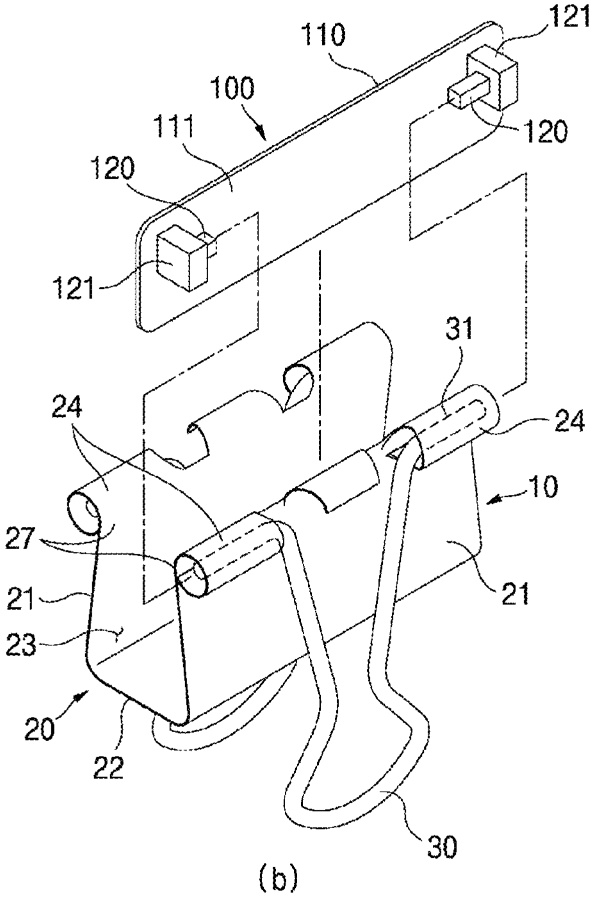
(b)

[FIG. 2]
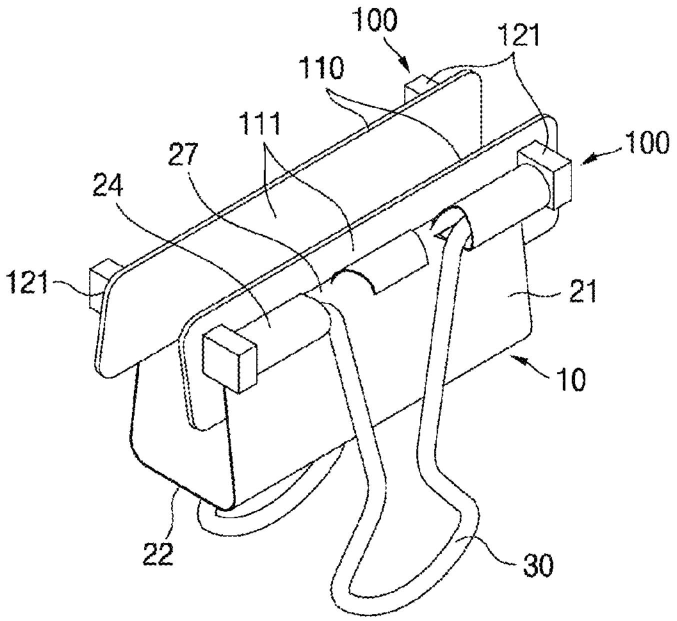
(a)
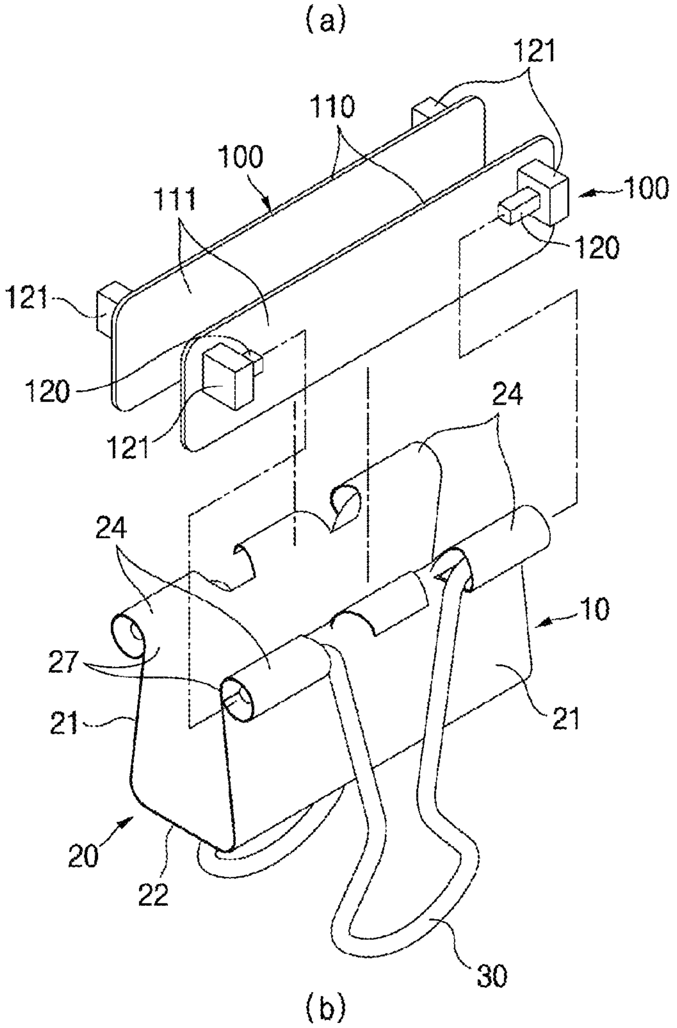
(b)

[FIG. 3]
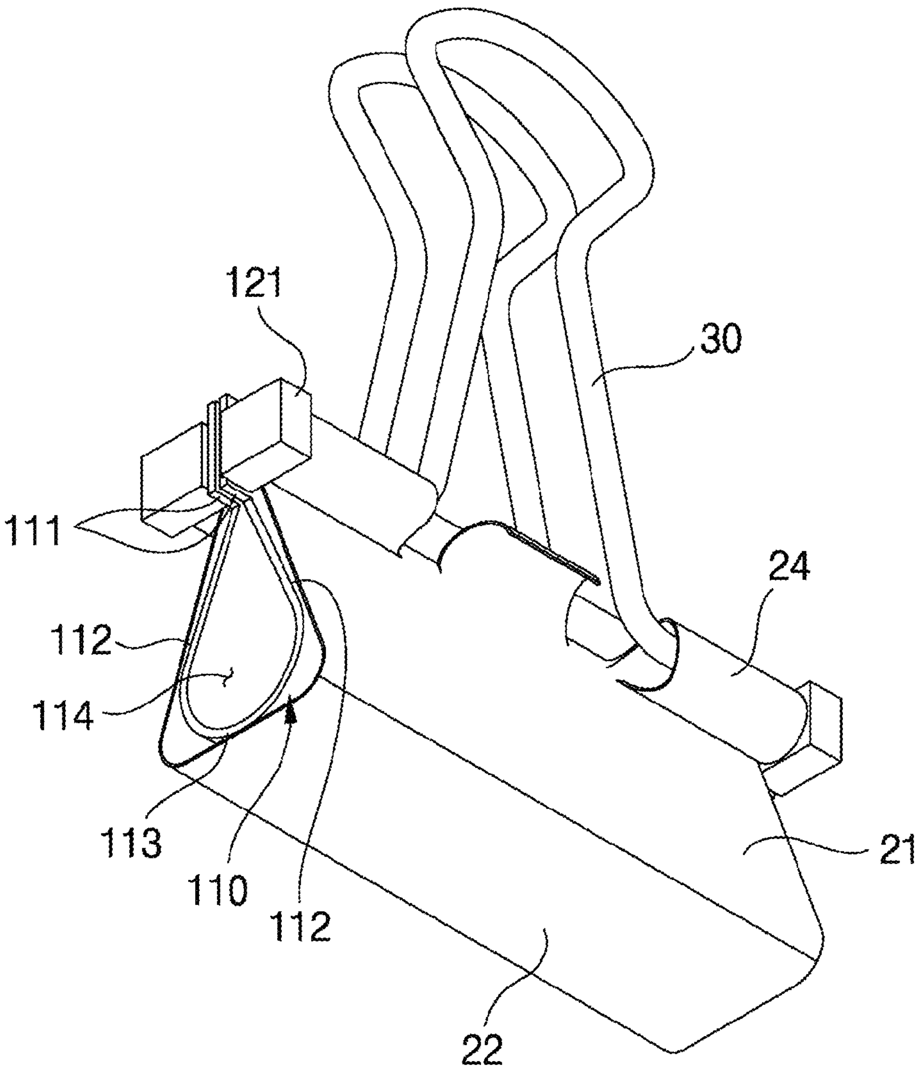

[FIG. 4]
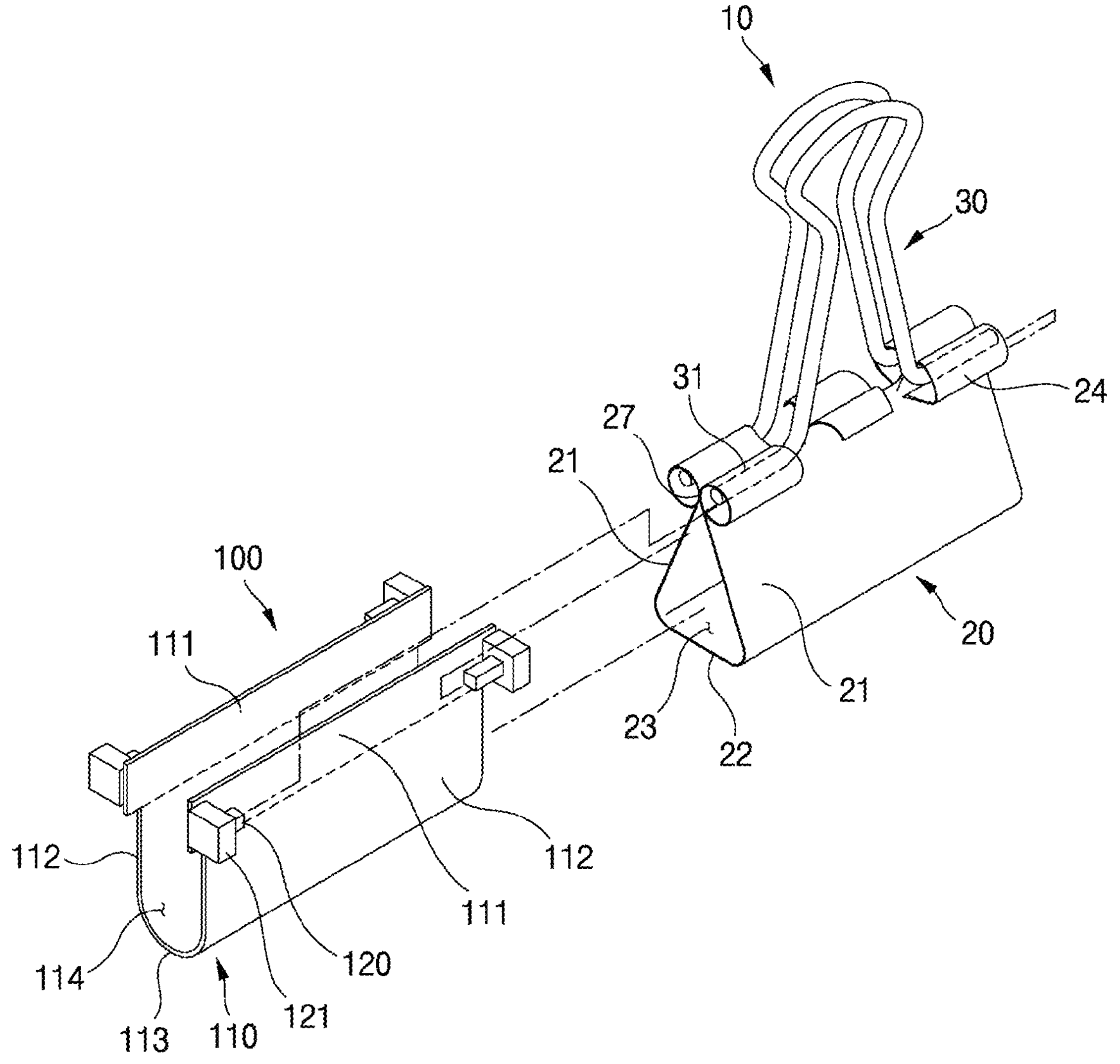

[FIG. 5]
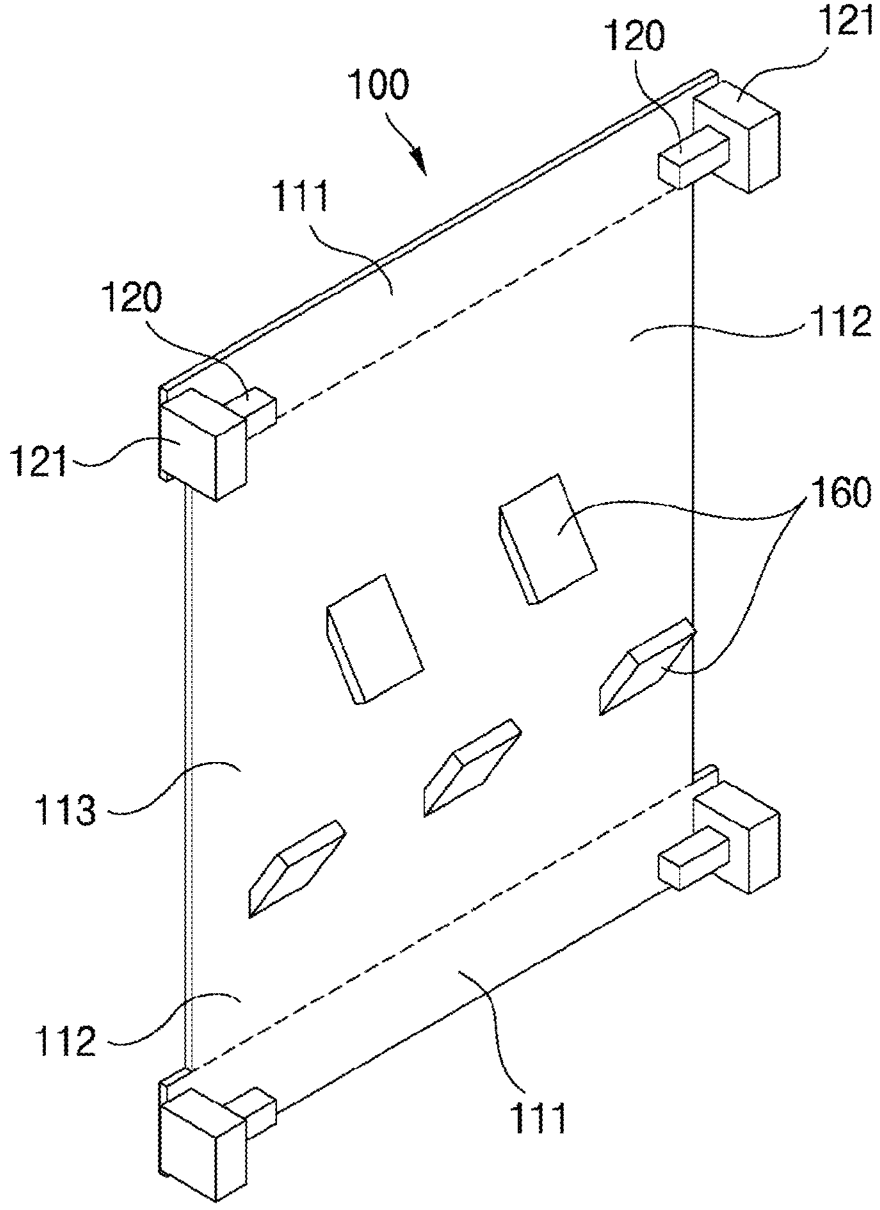

[FIG. 6]
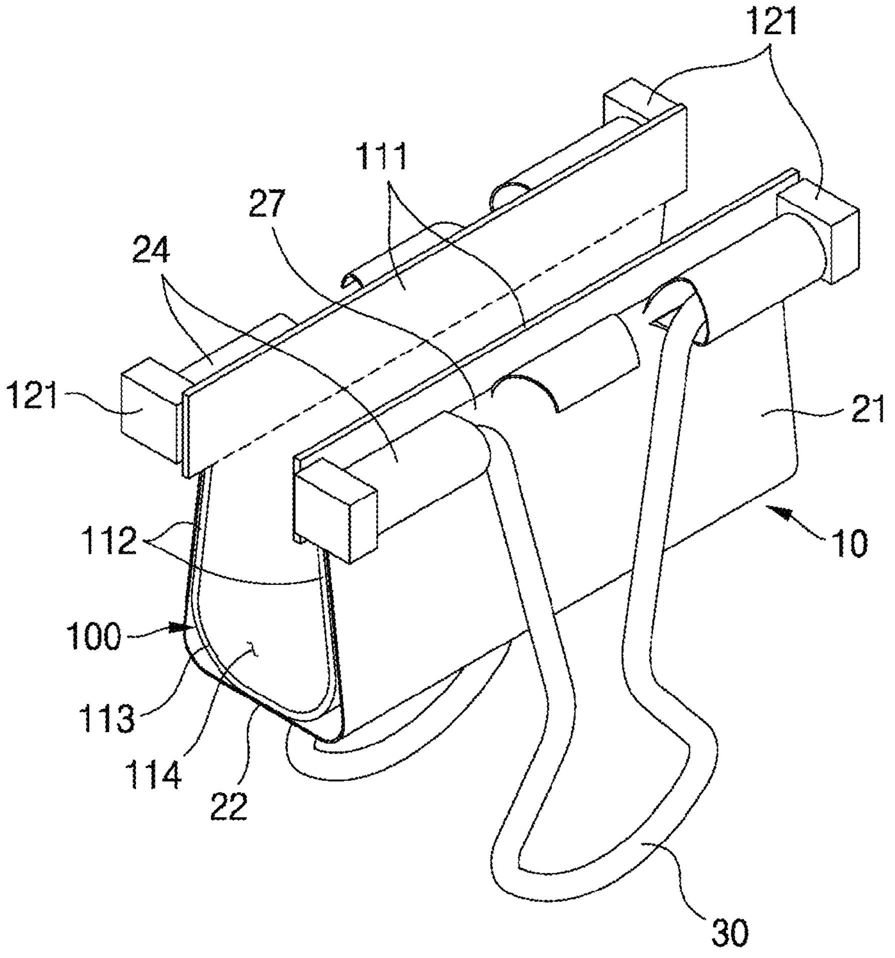

[FIG. 7]
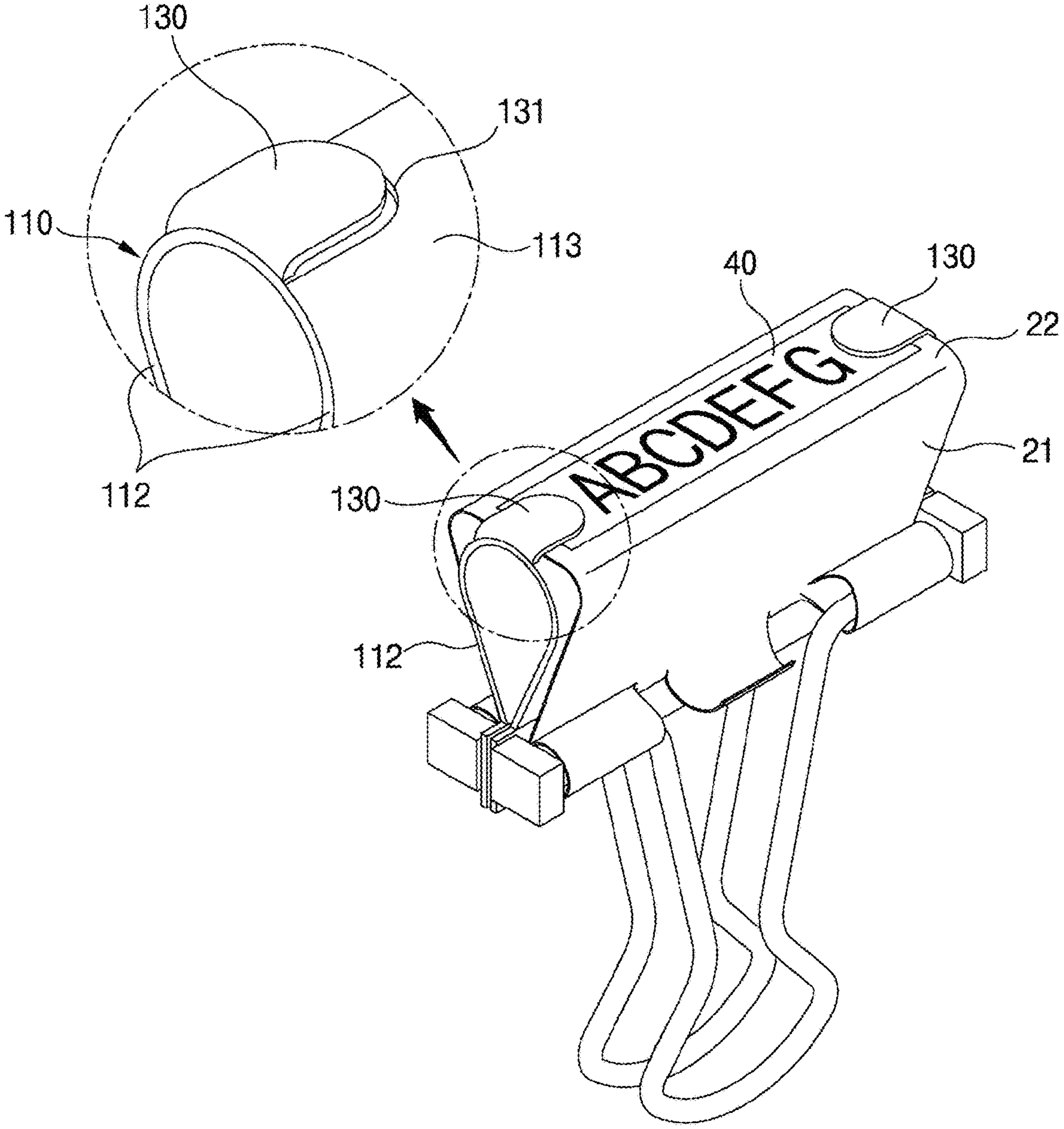

[FIG. 8]
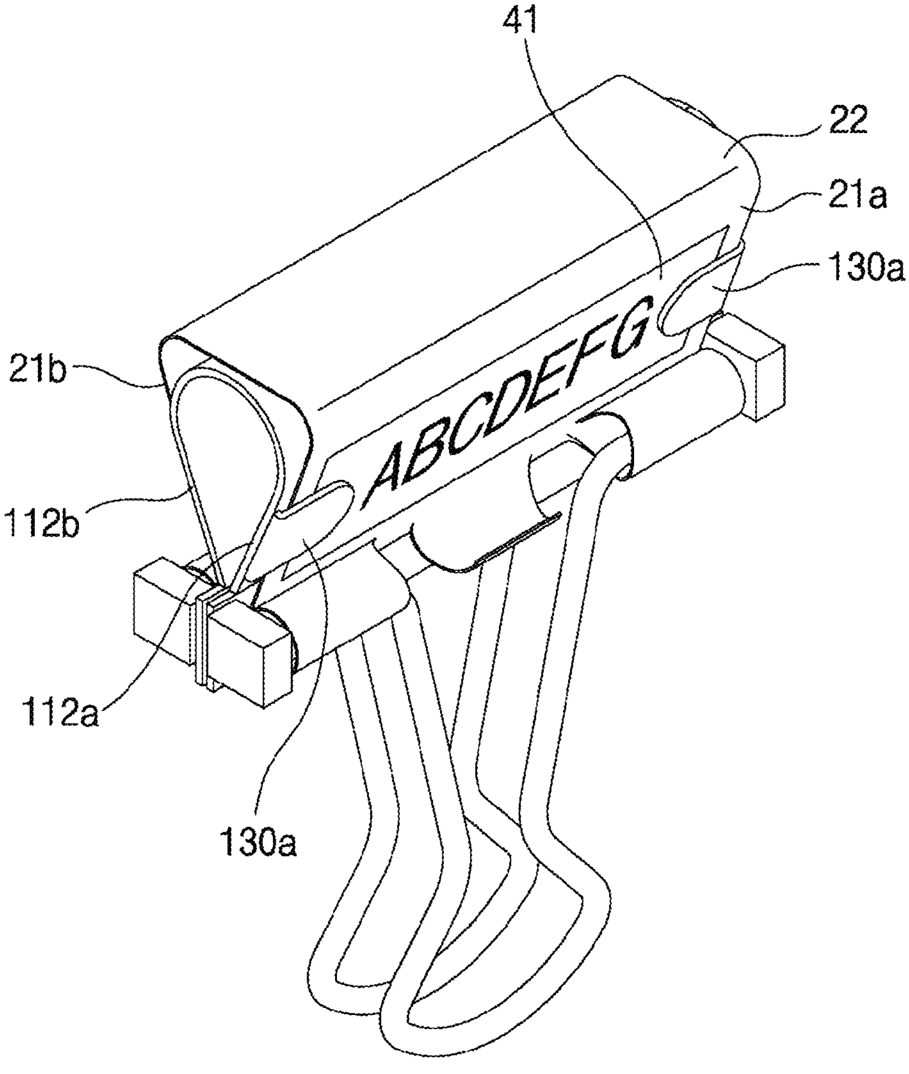

[FIG. 9]
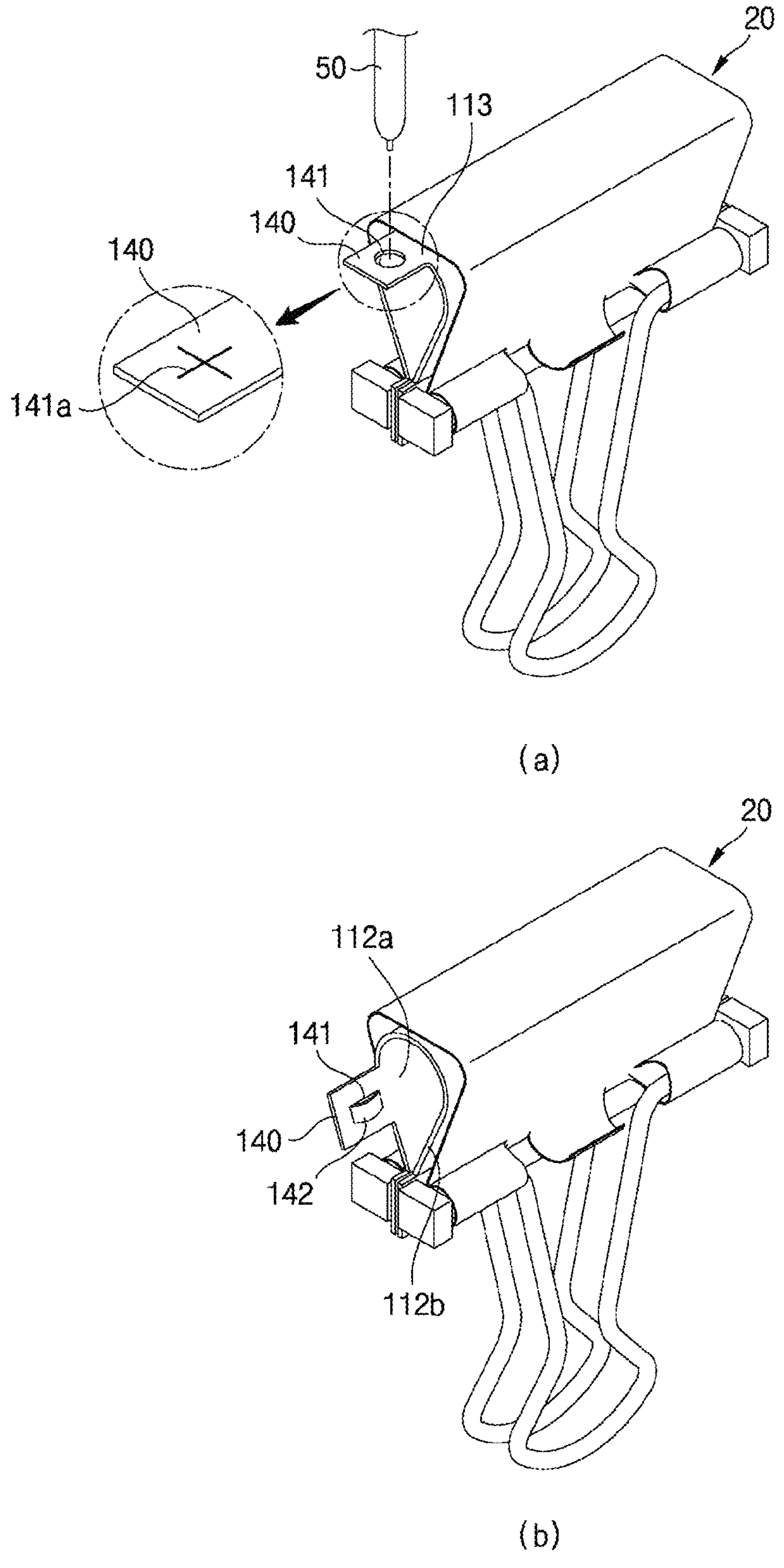

[FIG. 10]
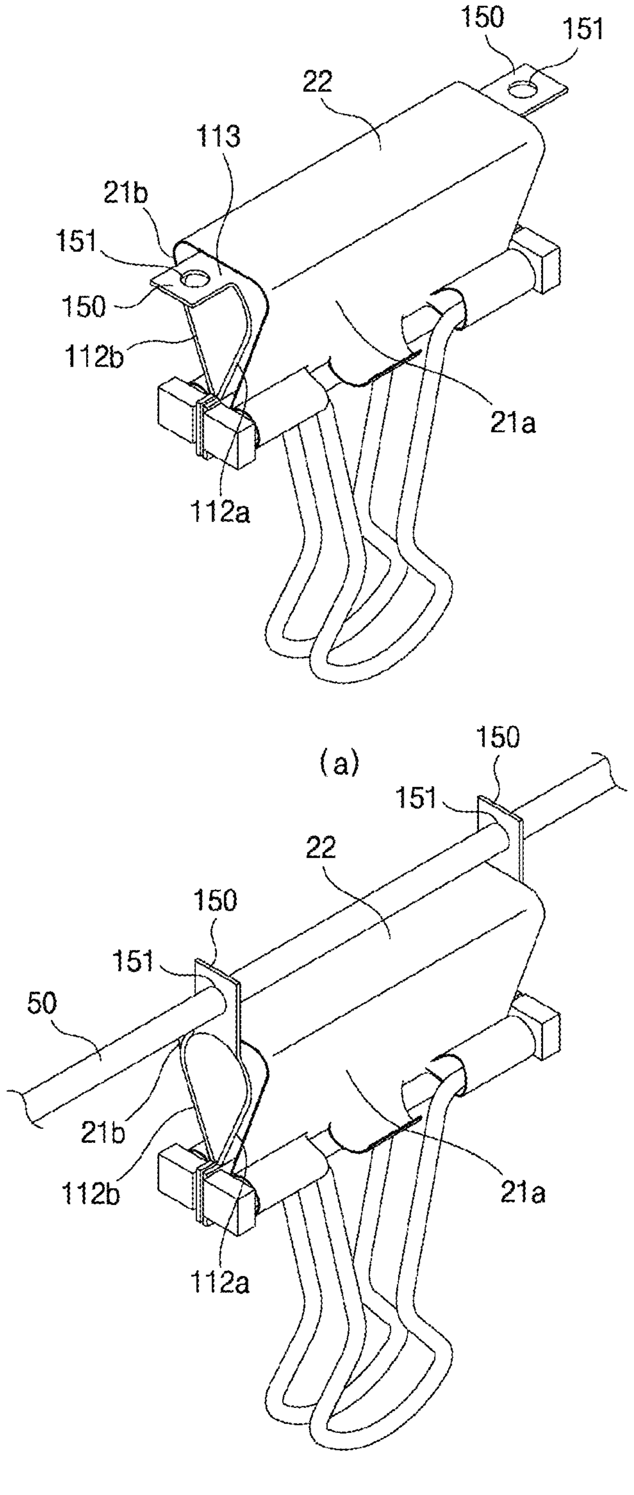
(b)

[FIG. 11]
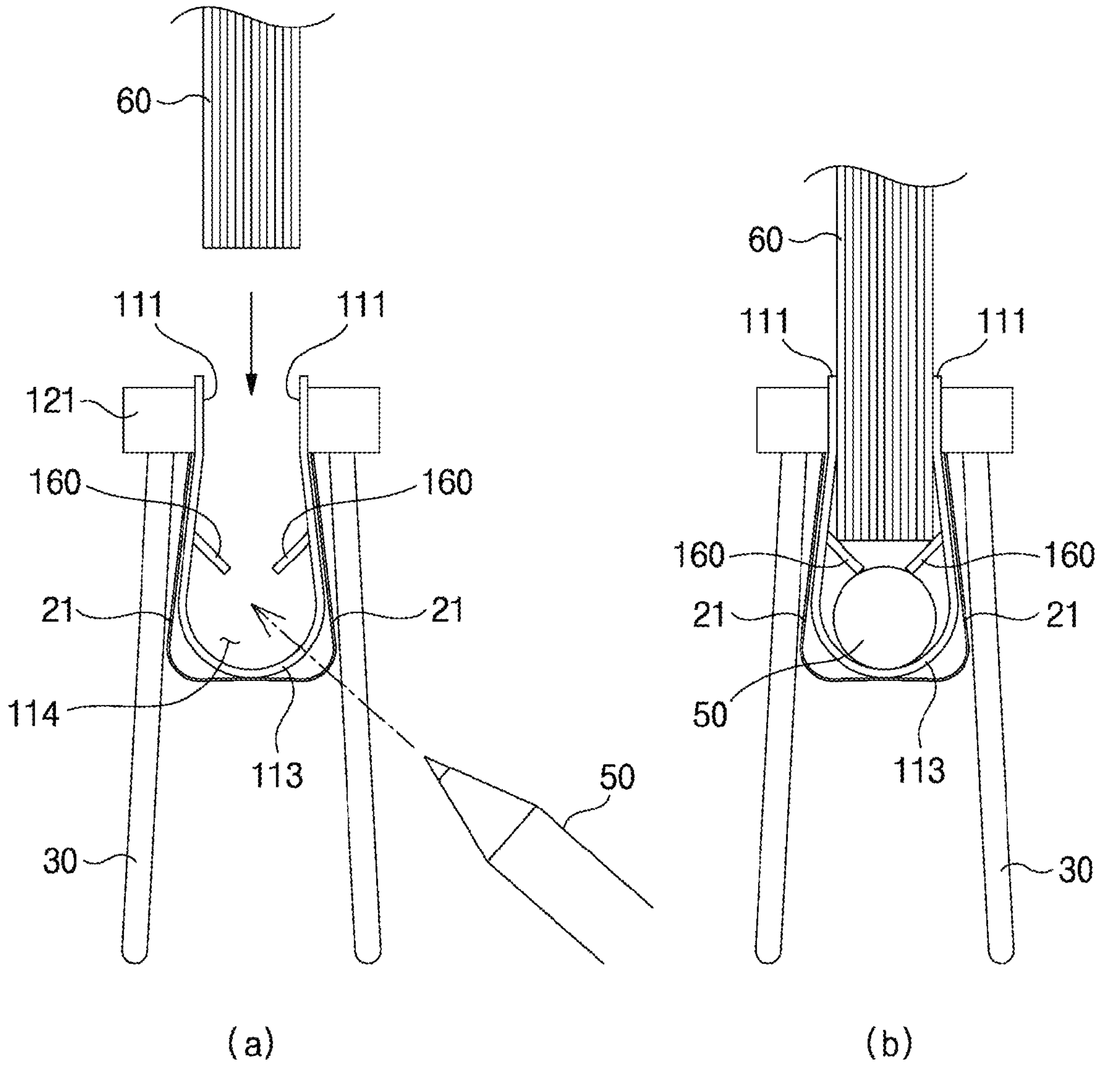

[FIG. 12]
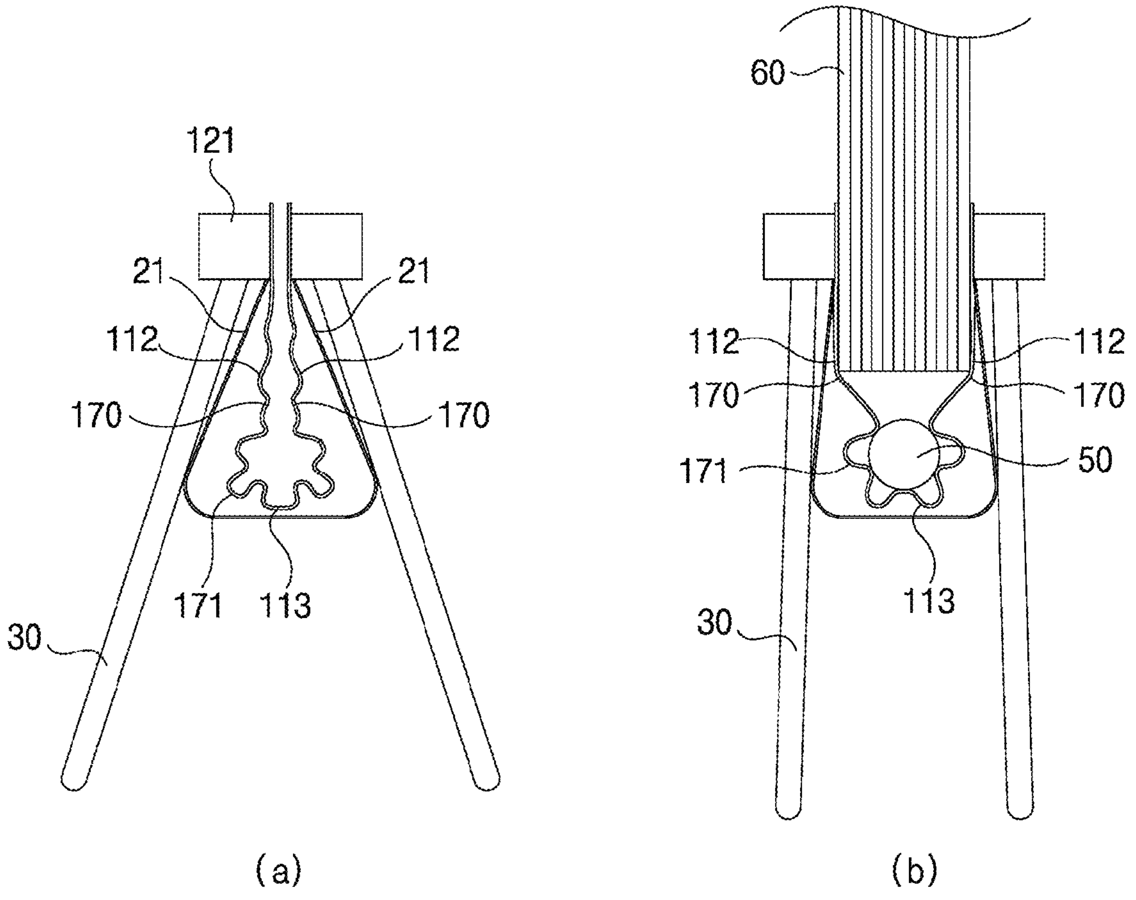

[FIG. 13]
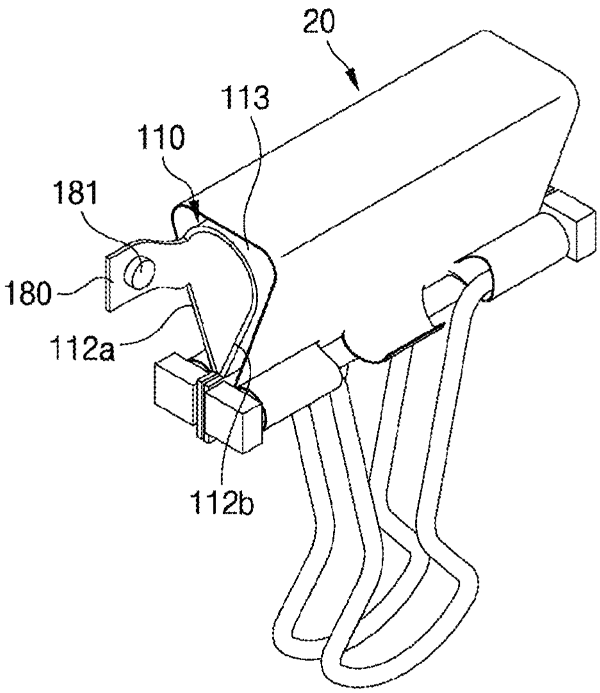
(a)
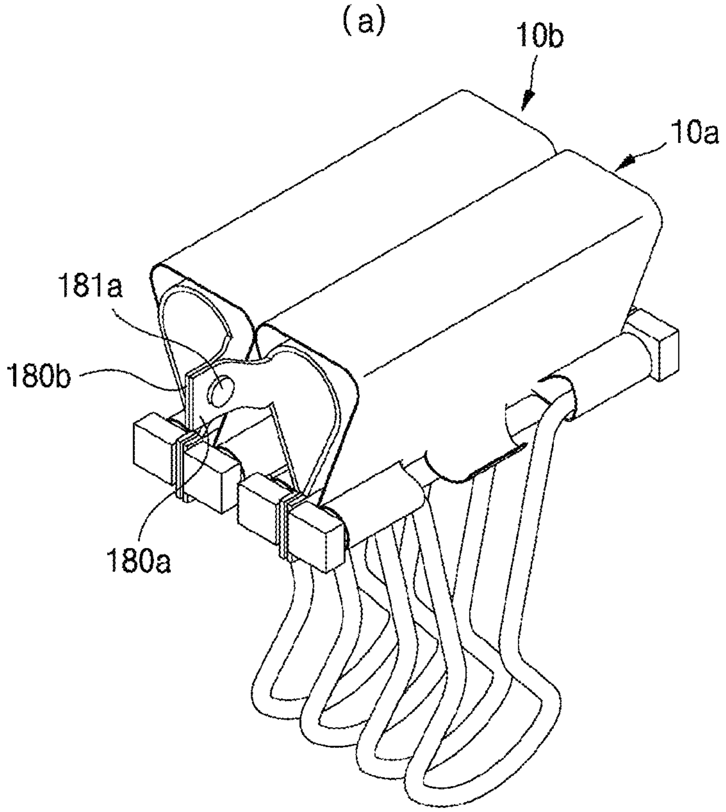
(b)

[FIG. 14]
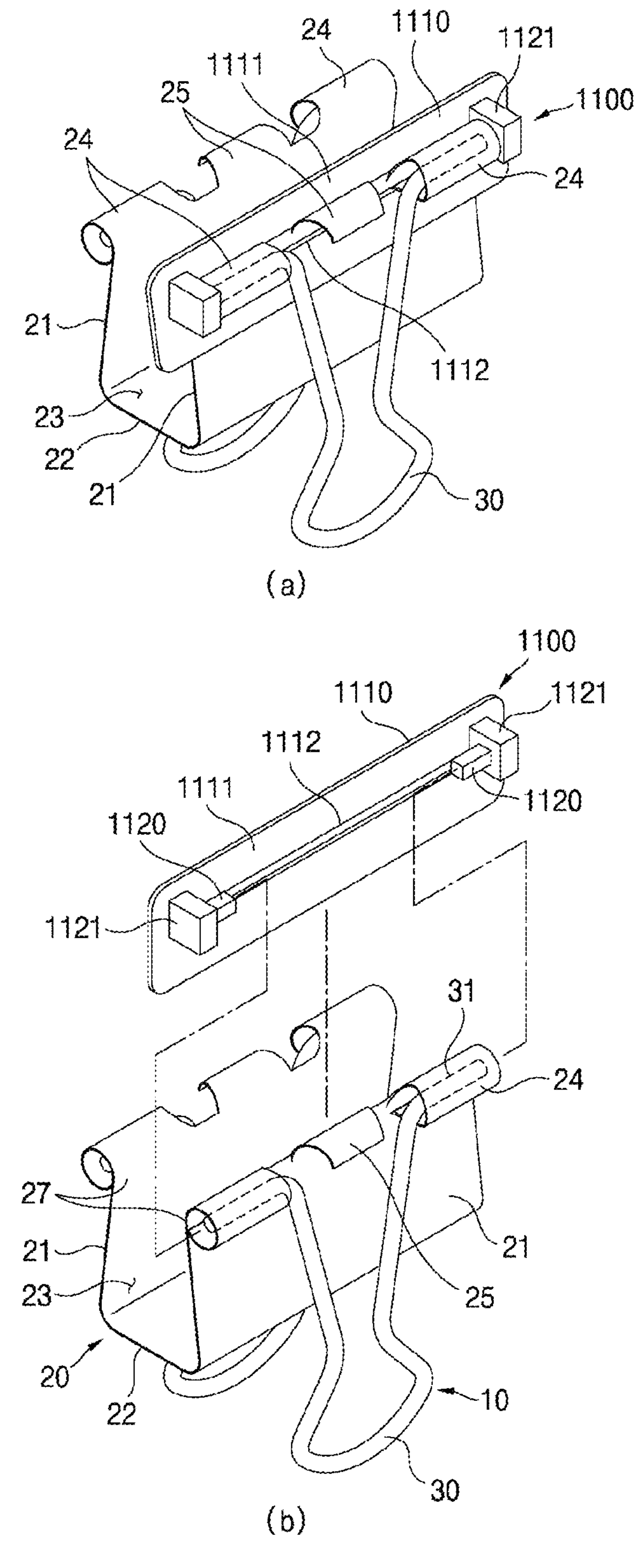

[FIG. 15]
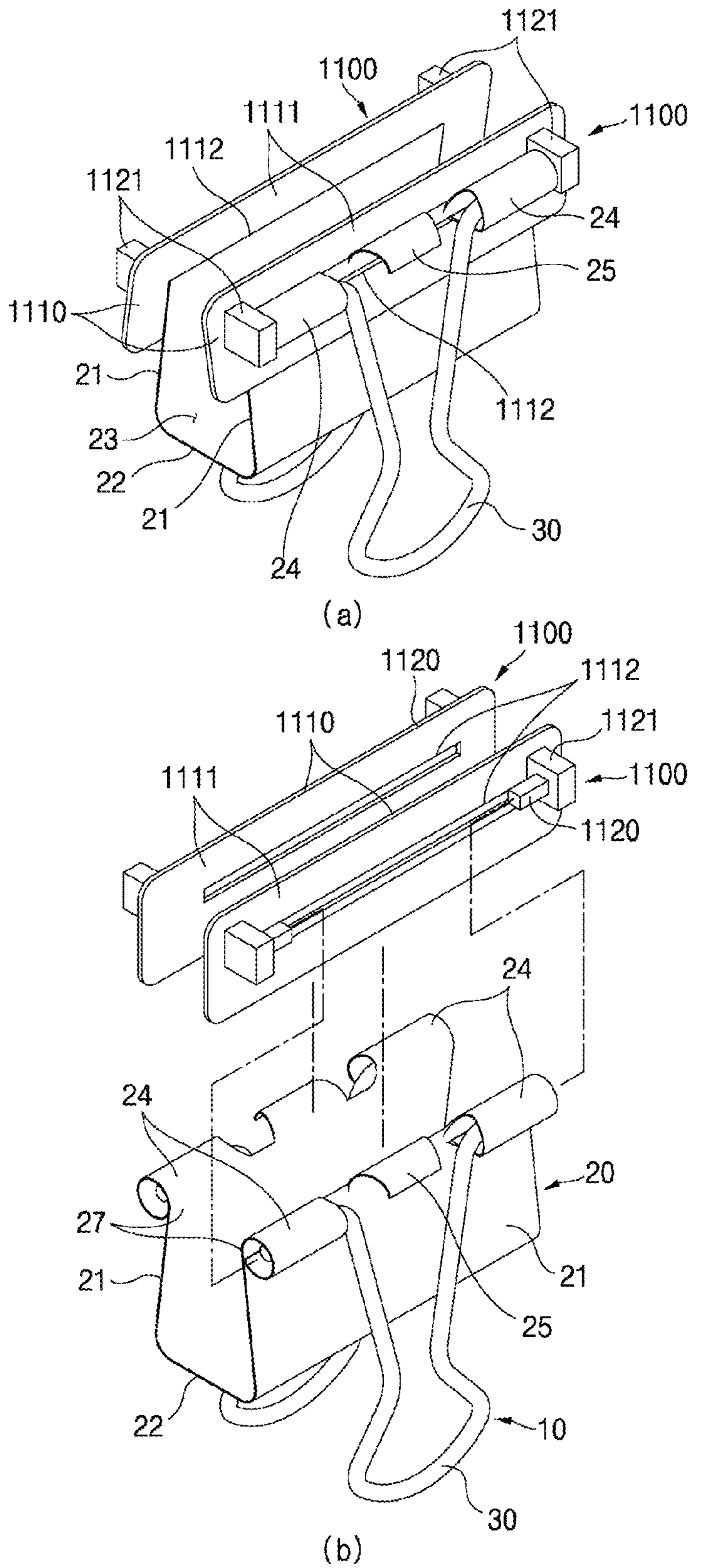
(a)
(b)

[FIG. 16]
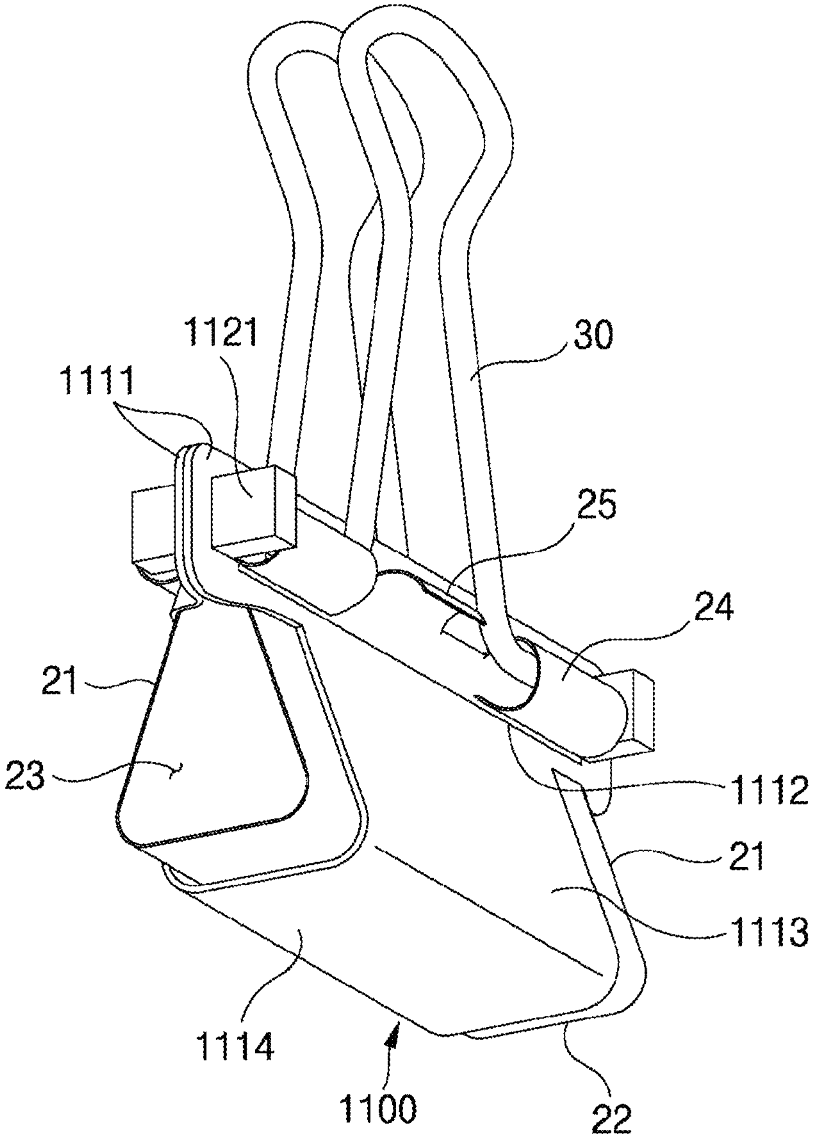

[FIG. 17]
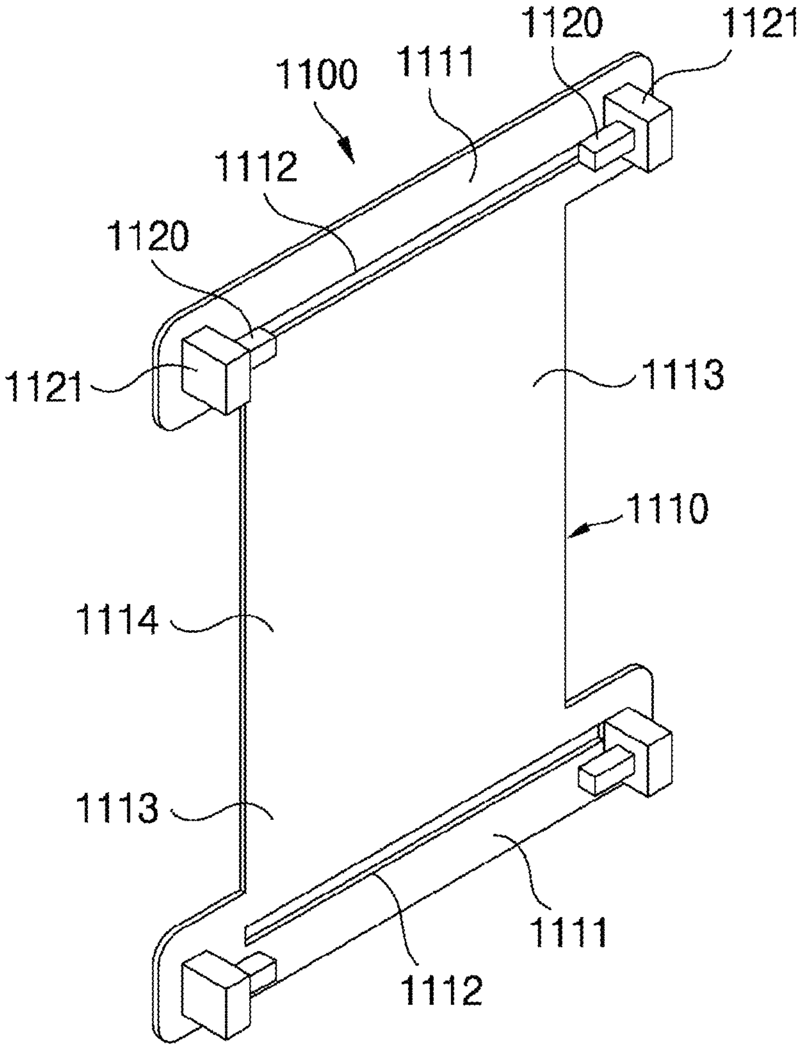

[FIG. 18]
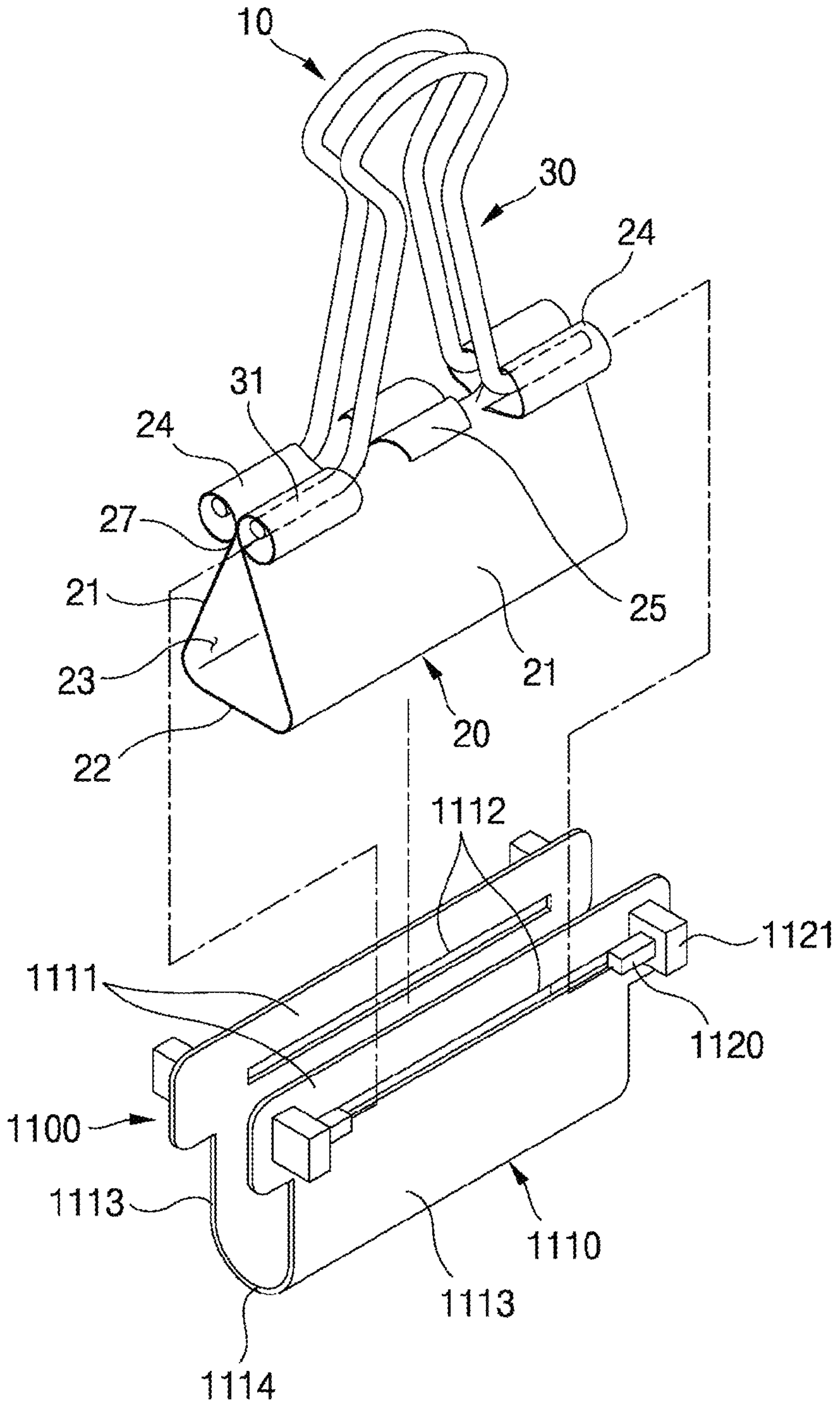

[FIG. 19]
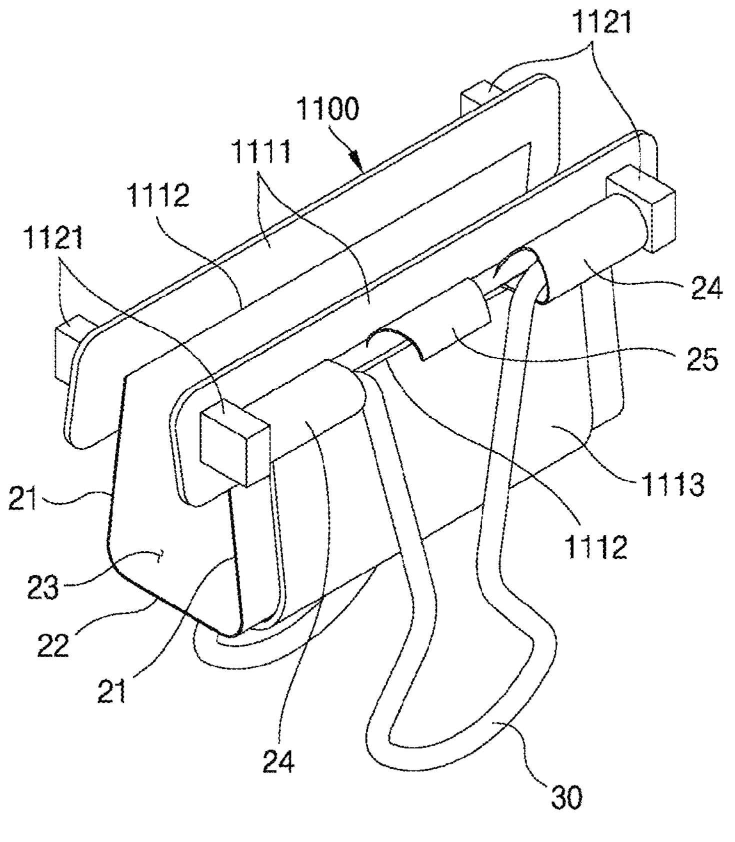

[FIG. 20]
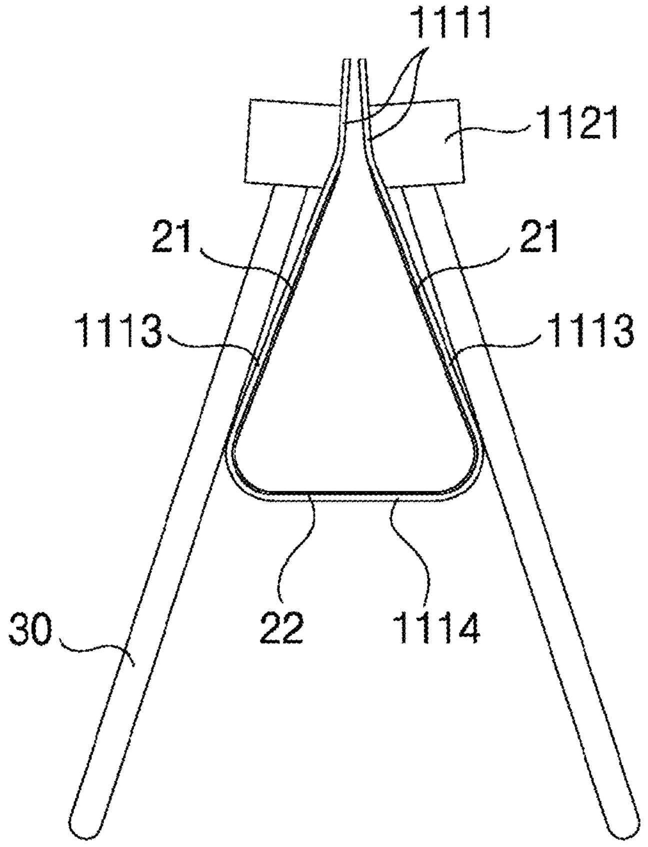

[FIG. 21]
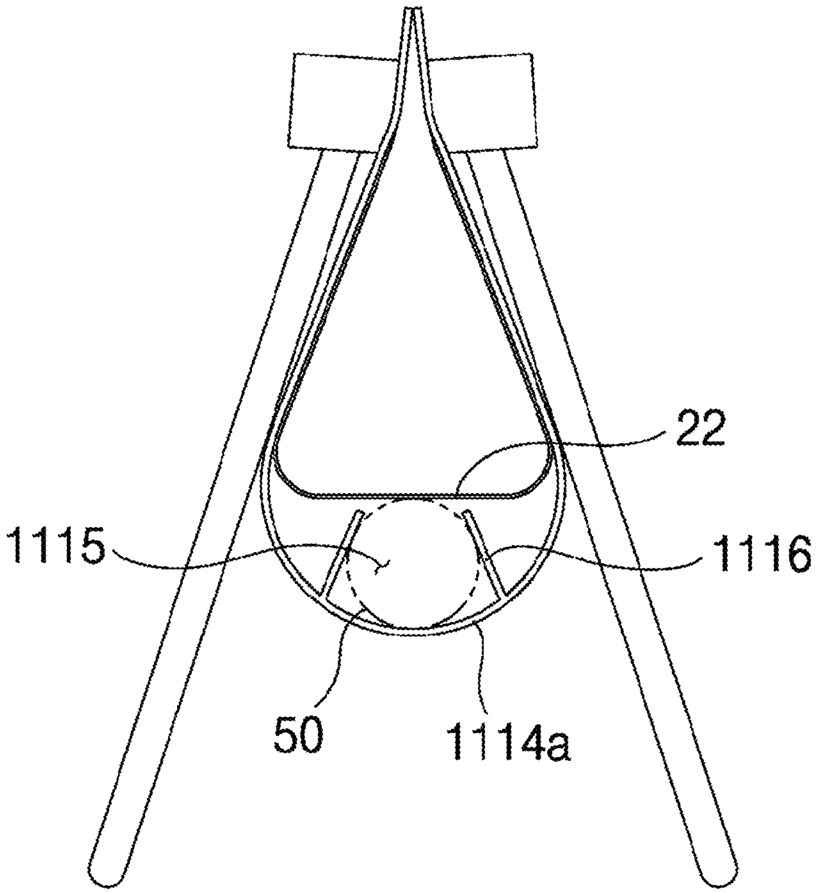

[FIG. 22]
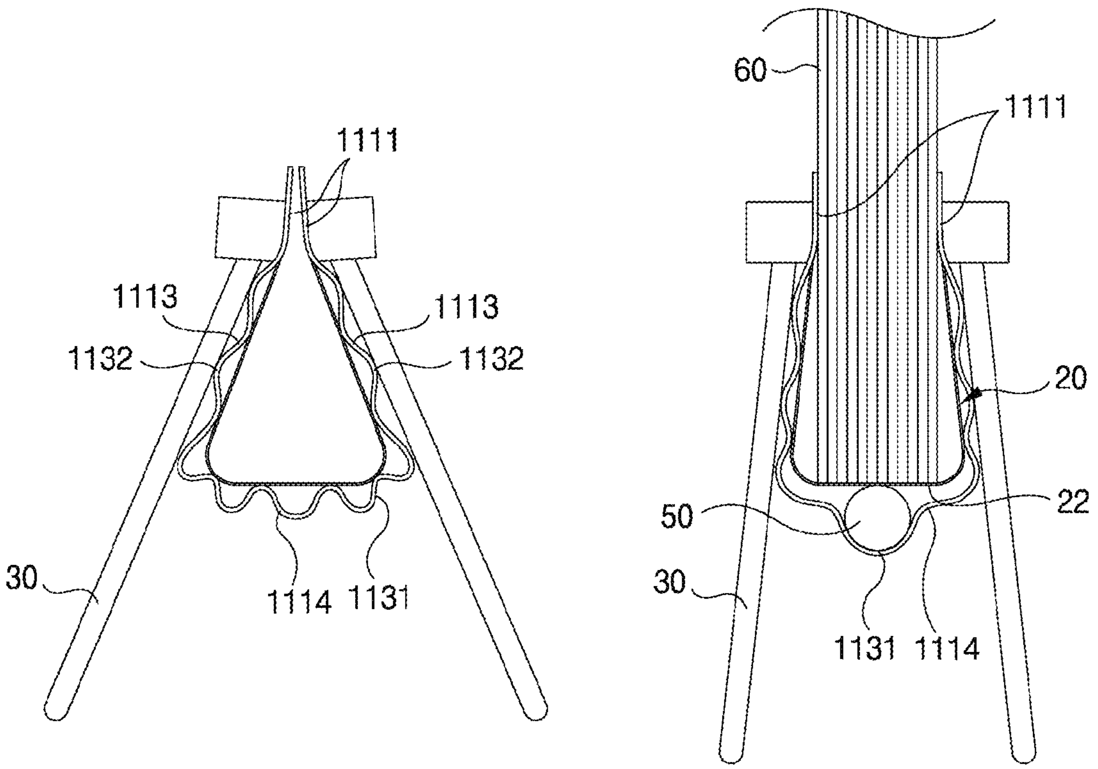
(a) (b)

[FIG. 23]
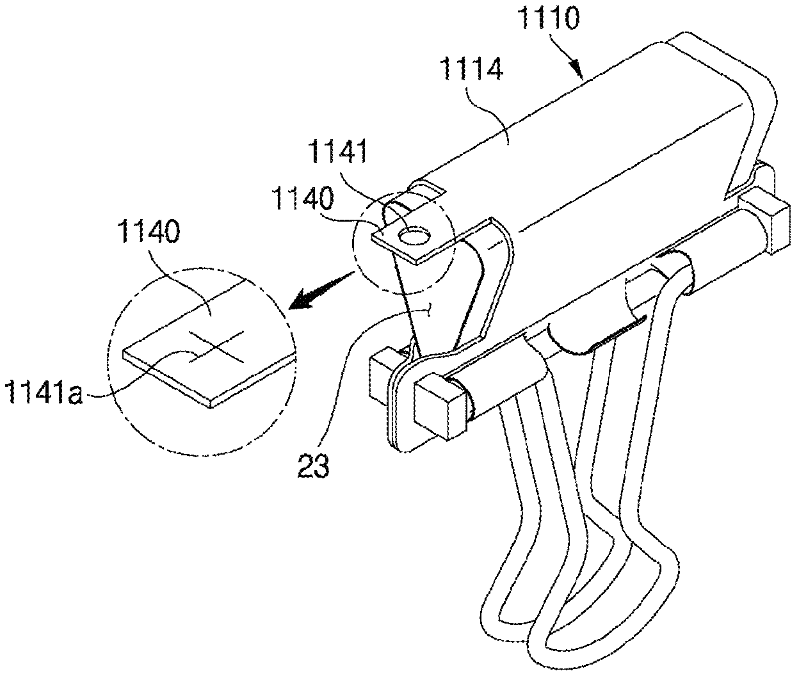
(a)
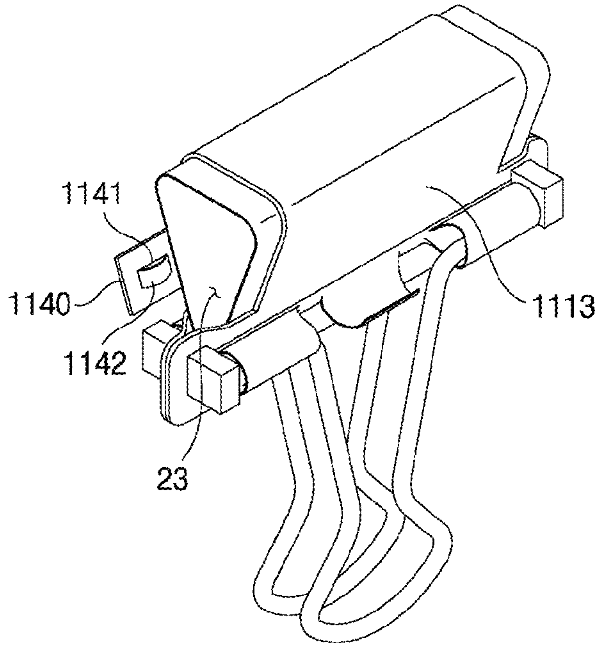
(b)

[FIG. 24]
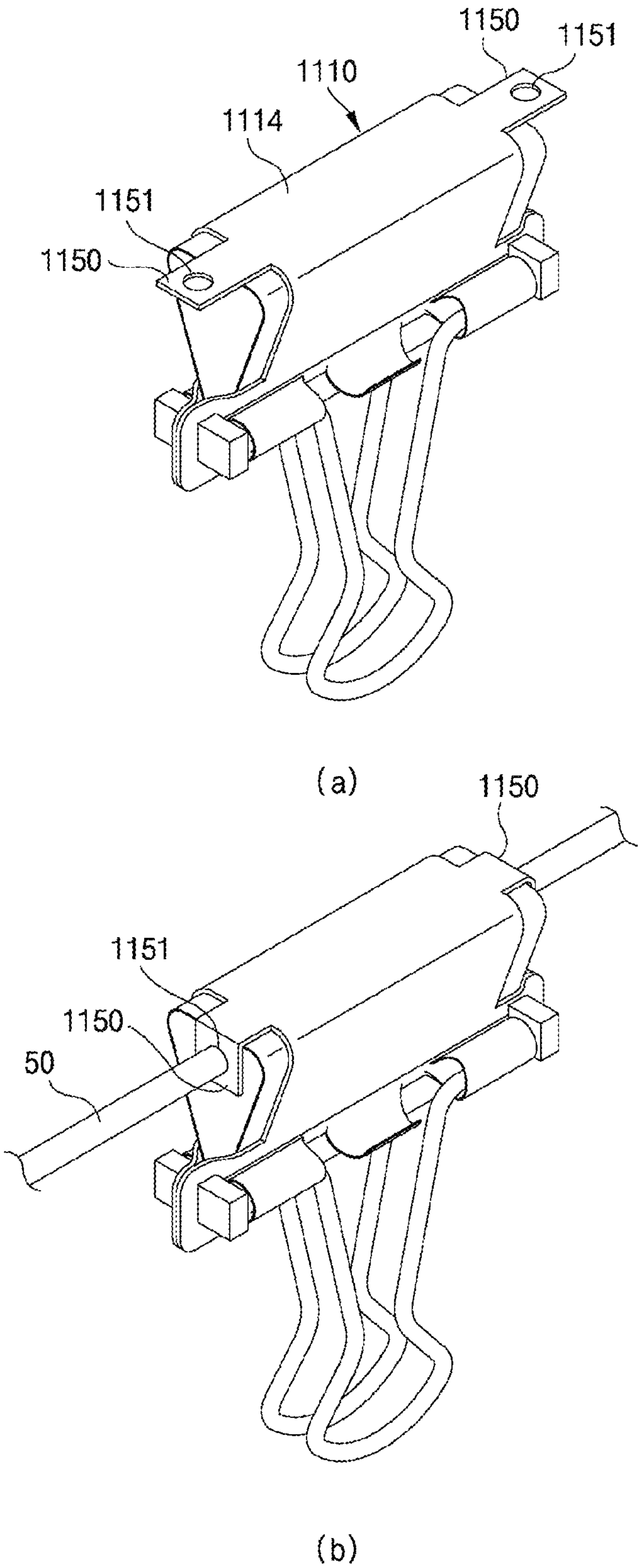

[FIG. 25]
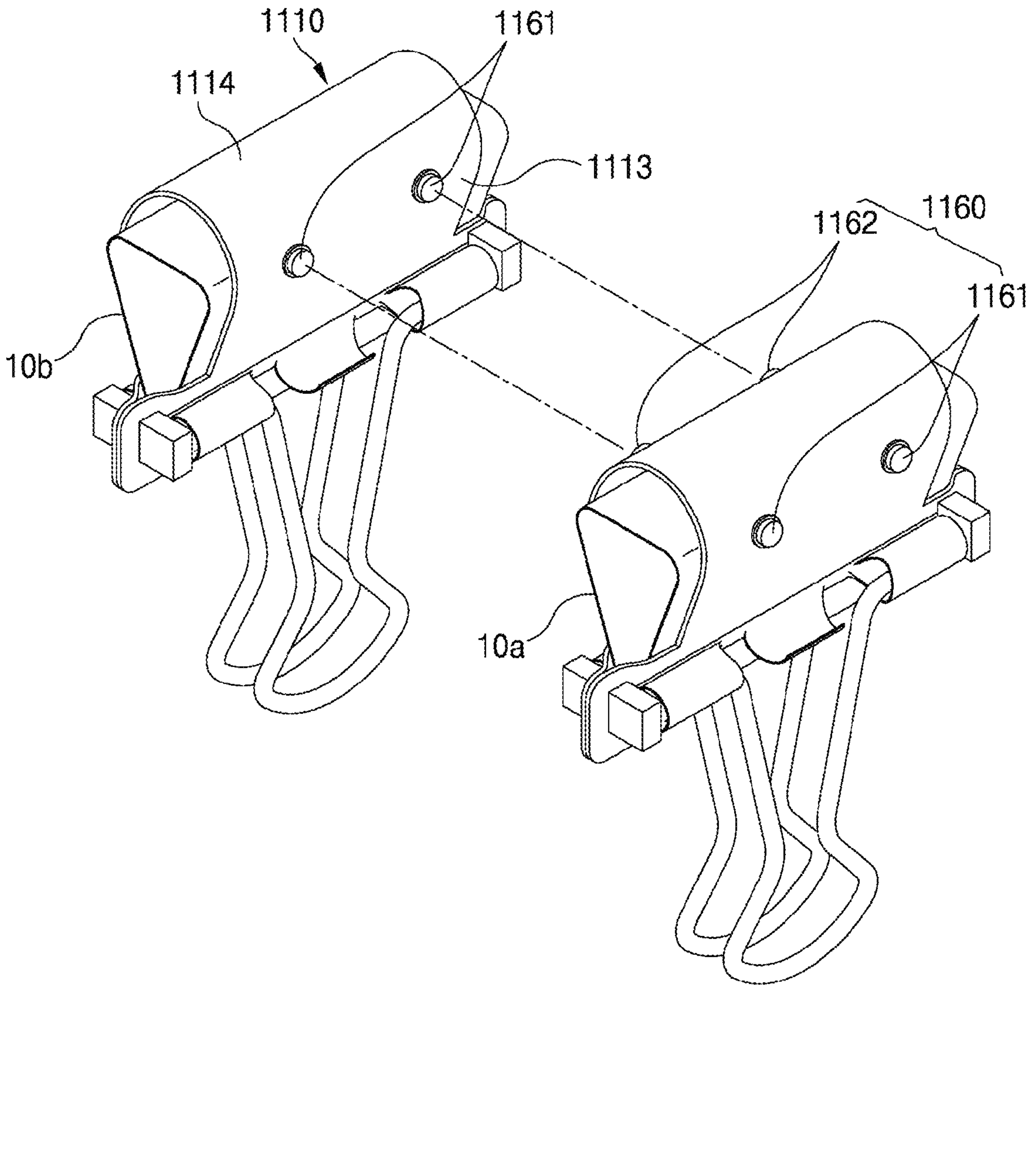

[FIG. 26]
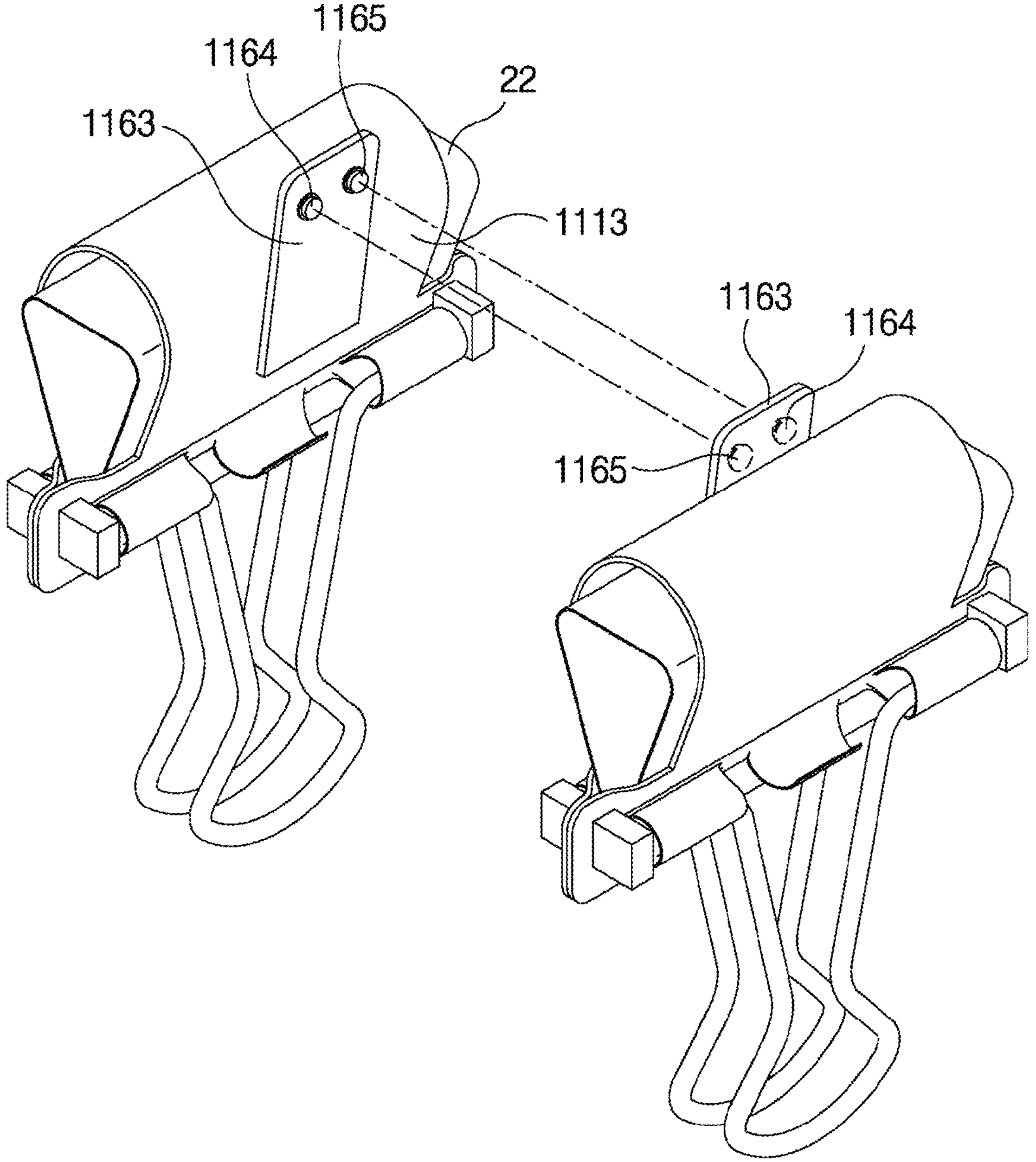

NON-SLIP ASSEMBLY FOR BINDER CLIP

CROSS-REFERENCE TO RELATED APPLICATIONS

The present application is the U.S. National Phase of PCT Application No. PCT/KR2021/015547 filed on Nov. 1, 2021, which claims the priority to Korean Patent Application No. 10-2020-0177543 filed with the Korean Intellectual Property Office on Dec. 17, 2020, Korean Patent Application No. 10-2021-0060182 filed with the Korean Intellectual Property Office on May 10, 2021, and Korean Patent Application No, 10-2021-0060183 filed with the Korean Intellectual Property Office on May 10, 2021, the entire contents of which are incorporated herein by reference.

DISCLOSURE

Technical Field

The present invention relates to a non-slip assembly for a clip device, and more particularly to a non-slip assembly for a clip device, for secure holding and with various conveniences in use.

Background Art

Referred to as a paper clamp or binder clip, a clip/clasping device typically has a structure with a pair of handles mounted onto a clip (device) body. The user presses (down) on the handles to widen the clip body, and the clip device is used to hold and bind multiple pages of documents.

The clip devices are formed in various sizes. Typically, documents are pushed toward an end of an inner portion of the clip body so that the clip device securely holds the documents. However, when an amount of the documents is less than the size of the clip device, there is a tendency for the documents to be easily loosened and scattered and not firmly bound.

And, as conventional clip devices are usually produced in metal, when the clip device is laid on hard and smooth surface, and when friction/frictional force is lacking in the inner portion as well, the clip device has problems of easily slipping and generating noise when the clip device is hit against a desk surface.

Also, with the absence of a functional capability to attach the clip device onto a writing instrument, there is inconvenience of having to carry the writing instrument separately with/from the documents.

Besides these, there are many cases where the user typically applies the clip device on an upper left portion or an upper central portion of the documents, and when such documents are stacked, there may not only be incidences where the clip device slips against one another but also difficulties in managing the documents as there is not a functional capability to combine the clip devices to bind similar documents or attach labels to distinguish (the) documents.

DETAILED DESCRIPTION OF INVENTION

Technical Problem

To solve such problems as above, a technical object to be attained by the present invention is to provide a non-slip assembly for a clip device (e.g., binder clip), for secure holding and with various conveniences in use.

Technical objects to be attained by the present invention are not limited by the technical object described herein, and non-described or other technical objects may be clearly understood by a person having ordinary skill in the art which is relevant to the present invention, based on the disclosure below.

Solutions to Problem

To attain the technical objects above, an embodiment of the present embodiment provides a non-slip assembly for a clip device, which is detachable from the clip device, the clip device, having: a clip device body having a pair of pressing ends, bent to have therein an insertion space, in which documents are inserted therein, and press the documents while being narrowed or closed up by elastic restoration force; and a pair of handles, coupled or attached/linked to a handle inserting inlet formed on the clip device body, and pressed so that the clip device body is widened; and the non-slip assembly may comprise a non-slip unit, which is formed in a flexible material having elasticity and frictional force, and is arranged between the pair of the pressing ends to be in contact with the documents inserted in the insertion space, and is pressed by the pair of the pressing ends to prevent slipping on the documents inserted; and an affixing portion, which is disposed as a pair at a both-ends portion of the non-slip unit, and inserted into the handle inserting inlet to attach the non-slip unit to the clip device body.

According to an embodiment of the present invention, the clip device body may have a clip side, which is formed as a pair, with the pressing end formed at an end portion thereon, and a connecting side, which connects the clip side; and the non-slip unit may be disposed on at least any one of the pair of the pressing ends.

According to an embodiment of the present invention, the clip device body may have a clip side, which is formed as a pair, with the pressing end formed at an end portion thereon, and a connecting side, which connects the clip side; and the non-slip unit, which is arranged along an outer surface of the clip device body, may have a pair of body bands, which is arranged to correspond to the clip side, and a connecting band, which is arranged to correspond to the connecting side, and connects the body band.

According to an embodiment of the present invention, the non-slip unit may have a label holding portion, which is formed as a pair by cutting at a both-ends portion of at least any one of the body band and the connecting band, and is closely attached at the clip device body for holding a label.

According to an embodiment of the present invention, the non-slip unit may have a first writing instrument holding portion, which is extendedly formed at an end portion of at least any one of the body band and the connecting band, and having a first holding hole, which is penetratingly formed and for holding a writing instrument inserted there-through.

According to an embodiment of the present invention, the non-slip unit may have a second writing instrument holding portion, which is extendedly formed at a both-ends portion of any one of the body band and the connecting band, and having a second holding hole, which is penetratingly formed and for holding a writing instrument inserted there-through.

According to an embodiment of the present invention, the non-slip unit may have at least one holding protrusion, which is protrudingly formed on a surface of the body band to support the documents, and with the connecting band, applies pressure on to hold the writing instrument.

Meanwhile, to attain the technical objectives above, another embodiment of the present invention provides a non-slip assembly for a clip device, which is detachable from the clip device, the clip device, having: a clip device body having a pair of pressing ends, which is bent to have therein an insertion space, in which documents are inserted therein, and which press the documents while being narrowed or closed up by elastic restoration force; and a pair of handles, which is attached/linked to handle inserting inlet formed on the clip device body, and pressed so that the clip device body is widened; and the non-slip assembly, comprising a non-slip unit, which is formed in a flexible material having elasticity and frictional force, and is arranged between the pair of the pressing ends to be in contact with the documents inserted in the insertion space, and is pressed by the pair of the pressing ends to prevent slipping on the documents inserted; and an affixing portion, which is disposed as a pair at a both-ends portion of the non-slip unit, and inserted into the handle inserting inlet to attach the non-slip unit to the clip device body; and the non-slip unit may comprise an insertion groove, which is formed by a cutting on the non-slip band so that the handle inserting inlet is inserted therethrough; wherein when the handle inserting inlet is inserted through the insertion groove, the non-slip band is disposed and located between the pair of the pressing ends and operate as one with the pair of the pressing ends.

According to an embodiment of the present invention, the clip device may have a clip side, which is formed as a pair, with the pressing end formed at an end portion thereon, and a connecting side, which connects the clip side; and the non-slip unit may be disposed on at least any one of the pair of the pressing ends.

According to an embodiment of the present invention, the clip device may have a clip side, which is formed as a pair, with the pressing end formed at an end portion thereon, and a connecting side, which connects the clip side; and the non-slip unit, which is arranged along an outer surface of the clip device body, may have a pair of body bands, arranged to correspond to the clip side, and a connecting band, which is arranged to correspond to the connecting side, and connects the body band.

According to an embodiment of the present invention, the connecting band may be formed longer than a width of the connecting side, so that an inserting space for inserting a writing instrument is formed between an inner surface of the connecting band and an outer surface of the connecting side.

According to an embodiment of the present invention, the non-slip unit may have at least one holding protrusion, which is protrudingly formed on the inner surface of the connecting band, and applies pressure on to hold the writing instrument inserted into the inserting space.

According to an embodiment of the present invention, the non-slip unit may have a first writing instrument holding portion, which is extendedly formed at an end portion of the connecting band, and having a first holding hole, which is penetratingly formed and for holding a writing instrument inserted there-through.

According to an embodiment of the present invention, the non-slip unit may have a linking portion, which is arranged on at least one of the body band and the connecting band; and each of the plurality of the non-slip assembly for a clip device may be coupled/linked to each other via the linking portion.

According to an embodiment of the present invention, the connecting band may be formed with a crinkle.

According to an embodiment of the present invention, the affixing portion may have an inserting hole cap, which is formed on a portion of the affixing portion to protrude more outwardly than the affixing portion, and is closely attached at the handle inserting inlet.

Advantageous Effects of Invention

According to an embodiment of the present invention, the non-slip unit may be formed in a flexible material having elasticity and friction/frictional force so as to securely hold the documents inserted.

Also, according to an embodiment of the present invention, the affixing portion arranged at both end portions (e.g., on either sides) of the non-slip unit may be inserted at the affixing portion of the handles of the clip device (e.g., binder clip), and the non-slip unit may be firmly attached and linked to the clip (device) body (e.g., binder clip body).

Also, according to an embodiment of the present invention, the non-slip unit may have the label holding portion for holding the label, the writing instrument holding portion and the holding protrusion, for holding a/the writing instrument, and the linking portion for coupling or attaching and linking a plurality of the non-slip assembly for a clip device; and the conveniences in use may be increased thereby.

Advantageous effects of the present invention are not limited to the advantageous effects described above, and must be understood to include all effects inferable from the elements of the invention disclosed in the detailed description or the claims of the present invention.

BRIEF DESCRIPTION OF DRAWINGS

FIG. 1 is an exemplary diagram describing “a non-slip assembly for a clip device” in a state of being attached or linked to a clip device, according to a 1st embodiment of the present invention.

FIG. 2 is an exemplary diagram describing “a non-slip assembly for a clip device” in a state of being attached or linked to a clip device, according to a 2nd embodiment of the present invention.

FIG. 3 is a perspective-view diagram showing “a non-slip assembly for a clip device” in a state, attached or linked to a clip device, according to a 3rd embodiment of the present invention.

FIG. 4 is a perspective-view detachment diagram of “the non-slip assembly for a clip device” in a state, detached from the clip device, according to the 3rd embodiment of the present invention.

FIG. 5 is a perspective-view diagram showing “the non-slip assembly for a clip device” in a state, spread and flattened, according to the 3rd embodiment of the present invention.

FIG. 6 is a perspective-view diagram showing “the non-slip assembly for a clip device” in a state, attached or linked to the clip device and widened (e.g., opens up or spread apart), according to the 3rd embodiment of the present invention.

FIG. 7 is an exemplary diagram describing a label holding portion of “the non-slip assembly for a clip device,” according to the 3rd embodiment of the present invention.

FIG. 8 is an exemplary diagram describing another example of the label holding portion of “the non-slip assembly for a clip device,” according to the 3rd embodiment of the present invention.

FIG. 9 is an exemplary diagram describing a 1st writing instrument holding portion of “the non-slip assembly for a clip device,” according to the 3rd embodiment of the present invention.

FIG. 10 is an exemplary diagram describing a 2nd writing instrument holding portion of "the non-slip assembly for a clip device," according to the 3rd embodiment of the present invention.

FIG. 11 is an exemplary diagram describing a holding protrusion of "the non-slip assembly for a clip device," according to the 3rd embodiment of the present invention.

FIG. 12 is an exemplary diagram describing another example of a/the non-slip unit of "the non-slip assembly for a clip device," according to the 3rd embodiment of the present invention.

FIG. 13 is an exemplary diagram describing a linking portion of "the non-slip assembly for a clip device," according to the 3rd embodiment of the present invention.

FIG. 14 is an exemplary diagram describing "a non-slip assembly for a clip device," in a state, attached or linked to a clip device, according to a 4th embodiment of the present invention.

FIG. 15 is an exemplary diagram describing "a non-slip assembly for a clip device," in a state of being attached or linked to a clip device, according to a 5th embodiment of the present invention.

FIG. 16 is a perspective-view diagram showing "a non-slip assembly for a clip device," in a state, attached or linked to a clip device, according to a 6th embodiment of the present invention.

FIG. 17 is a perspective-view diagram showing "the non-slip assembly for a clip device" in a state, spread and flattened, according to the 6th embodiment of the present invention.

FIG. 18 is a perspective-view detachment diagram of "the non-slip assembly for a clip device" in a state, detached from the clip device, according to the 6th embodiment of the present invention.

FIG. 19 is a perspective-view diagram showing "the non-slip assembly for a clip device" in a state, attached or linked to the clip device and widened (e.g., opens up or spread apart), according to the 6th embodiment of the present invention.

FIG. 20 is a side-view exemplary diagram showing "the non-slip assembly for a clip device" in a state, attached or linked to the clip device, according to the 6th embodiment of the present invention.

FIG. 21 is an exemplary diagram describing a/the connecting band and a/the holding protrusion of "the non-slip assembly for a clip device," according to the 6th embodiment of the present invention.

FIG. 22 is an exemplary diagram describing another example(s) of a/the body band and the connecting band of "the non-slip assembly for a clip device," according to the 6th embodiment of the present invention.

FIG. 23 is an exemplary diagram describing a 1st writing instrument holding portion of "the non-slip assembly for a clip device," according to the 6th embodiment of the present invention.

FIG. 24 is an exemplary diagram describing a 2nd writing instrument holding portion of "the non-slip assembly for a clip device," according to the 6th embodiment of the present invention.

FIG. 25 is an exemplary diagram describing a linking portion of "the non-slip assembly for a clip device," according to the 6th embodiment of the present invention.

FIG. 26 is an exemplary diagram describing another example of the linking portion of "the non-slip assembly for a clip device," according to the 6th embodiment of the present invention.

LIST OF REFERENCE NUMERALS FOR MAIN PARTS OF THE DRAWINGS

10: Clip (Device) 20: Clip (Device) Body
21: Clip (Device) Side/Surface(s) 22: Connecting Side/Surface
24: Handle inserting inlet 27: Pressing End(s)
30: Handle 40, 41: Label
50: Writing Instrument 60: Documents
100, 1100: Non-slip Assembly for a Clip (Device)
110, 1110: Non-slip Unit 111, 1111: Non-slip Band
112, 112*a*, 112*b*, 1113: Body Band 113, 1114: Connecting Band
120, 1120: Affixing Portion 121,1121: Inserting Hole Cap
130, 130*a*: Label Holding Portion 131: Cutting Line
140, 1140: A 1st Writing Instrument Holding Portion
150, 1150: A 2nd Writing Instrument Holding Portion
160, 1116: Holding Protrusion 170, 1131: 1st Crinkle
171, 1132: 2nd Crinkle 180, 1160: Linking Portion
1112: Inserting (Fitting) Hole or Slot Modes for Carrying Out Invention Hereinafter, the present invention is described with reference to the accompanying drawings. However, the present invention may be configured in many different forms, and accordingly, are not limited to the embodiments described herein. And in order to clearly/definitely describe the present invention, aspects and parts not related to such description are omitted, and throughout the entire disclosure, same/similar reference numerals are used for the same/similar elements in the drawings.

In the entire disclosure, when one element is described as being "joined (linked, contacted, combined)" to another element, this includes not only the case of being "directly joined" but also the case of being "indirectly joined" with another, 3rd element there between. Also, when an element is described to "include" another element, this means not that one element is excluded but that another element may be further included, unless there is a specific disclosure to the contrary.

Terminology used herein in the disclosure, is for the purpose of describing particular exemplary embodiments only and is not intended to limit the present invention. Language used to express singular forms includes the plural forms as well, unless the context clearly indicates otherwise. The language "comprising," "including," "having," etc. are intended to indicate the presence of described features, numbers, steps, operations, elements, and/or components, and should not be interpreted as precluding the presence or addition of one or more of other features, numbers, steps, operations, elements, components, and/or grouping or combination thereof.

Hereinafter, embodiments of the present invention are described in detail with reference to the accompanying drawings.

FIG. 1 is an exemplary diagram describing "a non-slip assembly for a clip device" in a state of being attached or linked to a clip device, according to a 1st embodiment of the present invention.

As shown in FIG. 1, the non-slip assembly (100) for a clip device may be detachable from the clip device (10).

The clip device (10) is typically called a paper clamp or binder clip, and the non-slip assembly for a clip device according to the present invention may be used by being attached or linked to the clip device (10) having: a clip (device) body (20), which is bent-formed (e.g., at an angle)

to have an insertion space (23) where a document is inserted there-inside, and which narrows and closes up, or comes to a closing by elastic restoration force; and a pair of handles (30), wherein both end portions (31) are attached/linked at/through the handle inserting inlets (24) which is formed on the clip body (30) and pressure is applied by the handles to widen or open up the clip body (20). The clip body (20) may have a clip side (21) which is formed as a pair, a connecting side (22) which connects the clip sides (21), and a pressing end (27) which is formed at an end portion of the clip side (21) and applies pressure or presses the documents when the clips side(s) (21) are narrowed and closed up.

The non-slip assembly for a clip device (100) may have a non-slip unit (110) and an affixing portion (120).

The non-slip unit (110) may be formed in a flexible material having elasticity and frictional force, and as an example of the material, rubber or silicone may be used.

The non-slip unit (110) may be disposed between the pressing ends (27) so that the documents inserted into the insertion space (23) come in contact, and may have a non-slip band (111) to prevent slipping with the documents pressed by the pressing ends (27) and inserted there into. In the present embodiment, the non-slip unit (110) may be arranged at any one of the pair of the pressing ends (27).

The affixing portion (120) may be arranged at both end portions (either ends) of the non-slip unit (110) as a pair, and may be extendedly formed in a central direction at the both end portions of the non-slip unit (110). The affixing portion (120) may be inserted at the handle inserting inlet (24) and attach/link the non-slip unit (110) to the clip body (20).

The non-slip unit (110) is inserted between the pair of the pressing ends (27), the affixing portion (120) may be inserted at the handle inserting inlet (24). So as not to let the inserted affixing portion (120) come out easily at the handle inserting inlet (24), the affixing portion (120) may be formed to have a cross-sectional area larger than an inner cross-sectional area of the handle inserting inlet (24). The non-slip unit (110) may be securely attached/linked at the clip body (20), as the affixing portion (120) is insertedly attached/linked at the handle inserting inlet (24).

Accordingly, when a user uses the handles (30) to widen (e.g., spread or open up) the clip sides (21), the non-slip bands (111) may widen as one with the clip side (21). And, when the clip sides (21) are narrowed or closed up by the elastic restoration force, the non-slip band(s) (111) is pressed by the pressing end (27) of the clip side (21) and is/are narrowed, and the documents within the insertion space (I may be effectively held/bound. At this time, the non-slip unit (110) is formed in a material having frictional force as described, and between the non-slip band(s) (111) which is/are pressed by the pressing ends (27), slipping of the documents is minimized and securely held. Here, the non-slip band (111) may be extendedly formed to have a width larger than a width of the pressing end (27), so that contact area with the documents may be increased.

Meanwhile, when the non-slip band (111) is pressed by the pressing end (27), the affixing portion (120) may be prevented from being released from the handle inserting inlet (24). That is, the affixing portion (120) and the non-slip unit (110) may interact with each other to prevent each other from getting out (of position).

And, the affixing portion (120) may have an inserting hole cap (121). The inserting hole cap (121) may be formed at an end portion of the affixing portion (120), and may be formed to protrude more outward than the affixing portion (120). Thus, when the affixing portion (120) is inserted at the handle inserting inlet (24), the inserting hole cap (121) may be firmly held/fixed at an end portion of the handle inserting inlet (24). As the inserting hole cap (121) is formed to protrude more outward than the affixing portion (120), the clip device (10) may be prevented from coming into contact with the ground, surface or floor, and from slipping, and from injuring the user with the clip device's corner, edges.

Also, the inserting hole cap (121) may function as a bumper which reduces noise and shock when the handle inserting inlet (24) comes in contact with the floor, and as such, it is preferable to form the inserting hole cap (121) with a width to completely cover the handle inserting inlet (24), and with a thickness to sufficiently reduce the shock.

FIG. 2 is an exemplary diagram describing "a non-slip assembly for a clip device" in a state of being attached or linked to a clip device, according to a 2nd embodiment of the present invention.

As shown in FIG. 2, in the present embodiment, the non-slip assembly for a clip device (100) may be formed in a plurality and all arranged in a pair of the pressing ends (27), and another/other configuration may be same as the 1st embodiment described above.

When the non-slip unit (110) is all arranged at the pair of the pressing ends (27), both side/surfaces of the documents inserted may all be closely pressed at the non-slip band (111), and as such, non-slip with respect to the documents may most certainly be realized.

FIG. 3 is a perspective-view diagram showing "a non-slip assembly for a clip device" in a state, attached or linked to a clip device, according to a 3rd embodiment of the present invention. FIG. 4 is a perspective-view detachment diagram of "the non-slip assembly for a clip device" in a state, detached from the clip device, according to the 3rd embodiment of the present invention. FIG. 5 is a perspective-view diagram showing "the non-slip assembly for a clip device" in a state, spread and flattened, according to the 3rd embodiment of the present invention. FIG. 6 is a perspective-view diagram showing "the non-slip assembly for a clip device" in a state, attached or linked to the clip device and widened (e.g., opens up or spread apart), according to the 3rd embodiment of the present invention.

As shown in FIG. 3 to FIG. 6, the non-slip unit (110) of the non-slip assembly for a clip device (100) may be disposed along an inner side/surface of the clip body (20), and have a body band (112) and a connecting band (113).

The body band (112) and the connecting band (113) may be formed in a sheet form (refer to FIG. 5), and in a flexible material having elasticity and frictional force. Accordingly, when the body band (112) and the connecting band (113) are attached/linked to the clip device (10), they may be inserted into the insertion space (23) of the clip device (10) and have a shape corresponding (analogous) to the clip body (20). At each of the body band (112), a pair of the non-slip band (11) may be connected, corresponding to the pair of the pressing ends (27).

When the non-slip unit (110) is inserted into the insertion space (23) of the clip device (10) and the affixing portion (120) is insertedly attached/linked at the handle inserting inlet (24), the body band (112) may be disposed so as to correspond to the clip side (21), and the connecting band (113) may be disposed so as to correspond to the connecting side (22). The connecting band (113) may a part for connecting a pair of the body band (112), and when referenced with respect to FIG. 5, the body band (112) may be applicable to an upper part and lower part of the non-slip unit (110), and the connecting band (113) may be applicable to a central part of the non-slip unit (110).

In a state where the affixing portion (120) is insertedly attached/linked at the handle inserting inlet (24), the non-slip band (111) is inserted into the insertion space (23) of the clip body (20), the non-slip unit (110) and clip body (2) may operate as one. That is, as shown in FIG. 6, when the user may use the handle(s) (30) to widen the clip side(s) (21), the body band(s) (112) may also be widened as one with the clip side(s) (21), and when the clip side(s) (21) is narrowed by the elastic restoration force, the body band(s) (112) may also be narrowed as one with the clip side(s) (21).

FIG. 7 is an exemplary diagram describing a label holding portion of "the non-slip assembly for a clip device," according to the 3rd embodiment of the present invention.

The non-slip unit (110) may have a label holding portion (130). The label holding portion (130) may be formed as a pair by cutting at least one of the both end portions of the body band (112) and/or the connecting band (113). And the label holding portion (13) may be firmly attached at, at least one place/position in/on an outer side/surface of either the clip side (21) or the connecting side (22).

FIG. 7 shows the case of the label holding portion (130) being formed at/on the connecting band (113); the label holding portion (13) may be formed by a cutting line (131) formed at/on the connecting band (113), and may be firmly attached at/on the outer side/surface of the connecting side (22) of the clip body (20). As described above, the non-slip unit (110) may be formed in a material having elasticity, and the label holding portion (130) may generate elastic restoration force in a direction, firmly attached at/on the outer side/surface of the connecting side (22). Accordingly, the label holding portion (130) may hold/fix both (either) ends of a label (40) and enable the label (40) to be held/fixed at/on the outer side/surface of the connecting side (22).

Meanwhile, FIG. 8 is an exemplary diagram describing another example of the label holding portion of "the non-slip assembly for a clip device," according to the 3rd embodiment of the present invention.

FIG. 8 show a case where a label holding portion (130*a*) is formed at/on a side of a body band (112*a*), among a pair of body bands (112*a*, 112*b*). The label holding portion (130*a*), which is formed by cutting the body band (112*a*), may be firmly attached on a side of a clip side (21*a*) among a pair of clip sides (21*a*, 21*b*), and through this, the label holding portion (131) may hold/fix both (either) ends of a label (41), and enable the label (41) to be held/fixed at/on the outer side/surface of the connecting side (21*a*).

The label holding portion may be formed on another/other side of the body band (112*a*) and enable the label to be attached at/on another/other side of the clip side (21*b*), and of course, the form of the label holding portion described above may be formed to be prepared in a plurality.

FIG. 9 is an exemplary diagram describing a 1st writing instrument holding portion of "the non-slip assembly for a clip device," according to the 3rd embodiment of the present invention.

As shown in FIG. 9, the non-slip unit (110) may have a 1st writing instrument holding portion (140).

The 1st writing instrument holding portion (140) may be extendedly formed on at least one end portion of the body bands (112*a*, 112*b*) and the connecting band (113). The 1st writing instrument holding portion (140) may be formed in a same material as that of the non-slip unit (110). The 1st writing instrument holding portion (140) may have a 1st holding hole (141), which is penetratingly formed, and at the 1st holding hole (141), a writing instrument (50) may be inserted and held.

That is, as shown in FIG. 9(*a*), the 1st writing instrument holding portion (140) may be extendedly formed on an end portion of the connecting band (113). The 1st writing instrument holding portion (140) may be formed outward of the clip body (20), and the writing instrument (50) may be conveniently inserted and held with ease, and with such method, the convenience in use may be increased as portability with the writing instrument is possible. The 1st holding hole (141) is not limited to a form of a hole, and may be formed in a form of a cross-shaped cutting line (141*a*).

As shown in FIG. 9(*b*), the 1st writing instrument holding portion (140) may be formed on one side of the body band (112*a*) or on another/other side of the body bands (112*b*) among the pair of the body bands (112*a*, 112*b*). The 1st holding hole (141) may be formed to further have a holding hole (142), which is formed by cutting a portion of the 1st writing instrument holding portion (140).

FIG. 10 is an exemplary diagram describing a 2nd writing instrument holding portion of "the non-slip assembly for a clip device," according to the 3rd embodiment of the present invention.

The non-slip unit (110) may have a 2nd writing instrument holding portion (150).

The 2nd writing instrument holding portion (150) may be extendedly formed at/on at least one of both (either) end portions of the body bands (112*a*, 112*b*) and the connecting band (113), and may have a 2nd holding hole (151), which is penetratingly formed.

FIG. 10 show a case where the 2nd writing instrument holding portion (150) is formed at/on the connecting band (113). The 2nd writing instrument holding portion (150) may be formed along with the 1st writing instrument holding portion (140), as a left-right pair. The 2nd writing instrument holding portion (150) may be formed in a same material as that of the non-slip unit (110), and as such, bending may be freely done. Accordingly, as in FIG. 10(*b*), by attaching/linking the writing instrument (50) in the 2nd holding hole (151) in a state where the 2nd writing instrument holding portion (150) is bent upward, the writing instrument (50) may be securely held. Although not shown, the 2nd writing instrument holding portion (150) may of course be formed at/on at least one body band among the pair of the body bands (121*a*, 121*b*).

FIG. 11 is an exemplary diagram describing a holding protrusion of "the non-slip assembly for a clip device," according to the 3rd embodiment of the present invention.

As shown in FIG. 5 and FIG. 11, the non-slip unit (110) may have at least one holding protrusion (160). The holding protrusion (160) may be formed at one side/surface of the body band (112). The holding protrusion (160) may protrude an inner insertion space (114), when the non-slip unit (110) is attached/linked to the clip device (10).

The holding protrusion (160) may be formed as a left-right pair, and formed with a length so as not to be in contact with each other, while arranged to face each other in the inner insertion space (114). Also, each holding protrusion (160) may be alternately disposed. The holding protrusion (160) may provide bare support of documents inserted into the inner insertion space (114) and inform of a limit or limiting position for inserting documents. When documents (60) are too deeply inserted, held, words printed at a top part of the documents (60) may not visible, but when the documents (60) are inserted only up to a depth supported by the holding protrusion (160), the problems of the words printed at the top part of the documents being not visible may be prevented.

Also, the holding protrusion (150) may enable the writing instrument (50) to be held by pressing the writing instrument (50) and/with the connecting band (113), when the writing instrument (50) is inserted into the inner insertion space (114).

The holding protrusion (160) may be disposed in a direction the documents are inserted—that is when with respect to FIG. 11, sloped toward the lower portion. Through this, when the user ignores small resistance of the holding protrusion (150) and inserts the documents (60) deeply, the holding protrusion (160) on a/the left and right sides may be bent or curved and the resistance may be minimized when the documents (60) are inserted. Accordingly, the documents (60) may be inserted to an end of the inside of the body band (112) or when taking them out, there may not be inconvenience in use and the use may be same as with a/the conventional clip (device). Additionally, when used as a pen stand, the functionality of securing/holding a/the writing instrument may be configured and arranged. That is, the holding protrusion (160) sloped toward the lower portion may effectively contact, press an outer surface of the inserted writing instrument (50) with the connecting band (113), and apply a bearing force/support to prevent the writing instrument (50) from being released or discharging. Generally, when considering a diameter of the writing instrument (50), a location of the holding protrusion (160) may be determined and the holding protrusion (160), disposed so that a distance from the connecting band (113) to the holding protrusion (160) is smaller than the diameter of the writing instrument (50).

FIG. 12 is an exemplary diagram describing another example of a/the non-slip unit of "the non-slip assembly for a clip device," according to the 3rd embodiment of the present invention.

As shown in FIG. 12, the body band (112) and the connecting band (113) may be formed with crinkles. That is, the body band (112) may be formed to have a 1st crinkle (170), and the connecting band may be formed to have a 2nd crinkle (171). The 1st crinkle (170) of the body band (112) may increase pressure applied on the documents inserted and thereby increase the non-slip effect.

And, the connecting band (113) may be formed with a more thickness than the body band (112), or in a form having a crinkle with the 2nd crinkle (171) smaller than the 1st crinkle (170). In such case, because the connecting band (113) may have an increased stiffness than the body band (112), inserting the documents (60) may be made to be limited to within a region of the body band (112), and the writing instrument (50) may be made to be inserted and held within a region of the connecting band (113).

FIG. 13 is an exemplary diagram describing a linking portion of "the non-slip assembly for a clip device," according to the 3rd embodiment of the present invention.

As shown in FIG. 13, the non-slip unit (110) may have a linking portion (180). The linking portion (180) may be formed at/on at least one of the body band (112) and the connecting band (113) and be extended outward of the clip body (20). The linking portion (180) my be formed as one with the non-slip unit (110).

As shown in FIG. 13(*b*), each of the linking portion(s) (180) of the non-slip assembly for a clip device may be attached/linked to each other or one another, and through this, a plurality of the non-slip assembly for a clip device may be attached/linked to each other. The linking portion (180) may have a linking hole (181), and the linking hole (181) may be attached/linked or released (off of) other, another one of the linking hole (181). According to this, when a plurality of a clip device (10*a*, 10*b*), each holding documents, are in contact with each other yet stacked up, the clip device (10*a*, 10*b*) may not slip. Accordingly, relevant documents (e.g., document sets) may be attached/linked and carried and stored in a bound state. The linking member (180) may be configured in various forms, including a button form, a fastener form, etc. Also, the linking member (180) may by extendedly formed, to be extended at/from the 1st writing instrument holding portion (140) and the 2nd writing instrument holding portion (150) as described above.

FIG. 14 is an exemplary diagram describing "a non-slip assembly for a clip device," in a state, attached or linked to a clip device, according to a 4th embodiment of the present invention.

As shown in FIG. 14, a non-slip assembly for a clip device (1100) may be detachable from the clip device (10).

The non-slip assembly for a clip device (1100) according to the present invention may be used by being attached or linked to the clip device (10) having: the clip (device) body (20), which is bent-formed (e.g., at an angle) to have then insertion space (23) where the document is inserted thereinside, and which narrows and closes up, or comes to a closing by the elastic restoration force; and the pair of handles (30), wherein the both end portions (31) are attached/linked at/through the handle inserting inlets (24) which is formed on the clip body (30) and pressure is applied by the handles to widen or open up the clip body (20). The clip body (20) may have the clip side (21) which is formed as a pair, the connecting side (22) which connects the clip sides (21), and the pressing end (27) which is formed at an end portion of the clip side (21) and applies pressure or presses the documents when the clips side(s) (21) are narrowed and closed up. The pressing end (27) may be a part which is in close proximity to the handle inserting inlet (24) and a bent portion (25), and when the clip body (20) is narrowed, a large pressure may be generated at the pressing end(s) (27).

The non-slip assembly for a clip device (1100) may have a non-slip unit (1110) and an affixing portion (1120).

The non-slip unit (1110) may be formed in a flexible material having elasticity and frictional force, and as an example of the material, rubber or silicone may be used.

The non-slip unit (1110) may have a non-slip band (1111) and an inserting (fitting) hole or slot (1112).

The inserting hole or slot (1112) may be formed by a cutting at the non-slip band (1111). At the inserting hole or slot (1112), the handle inserting inlet (24) of the clip device (10) and the bent portion (25) formed between the handle inserting inlet(s) (24) may inserted. When the handle inserting inlet (24) and the bent portion (25) are inserted at/into the inserting hole or slot (1112), the non-slip band (1111) may be disposed/located between the pressing end(s) (27) and operate as one with the pressing end(s) (27). The documents inserted into the insertion space (23) may come in contact at the non-slip band (1111), when the non-slip band (1111) pressed by the pressing end(s) (27) applies pressure and presses the documents, the documents inserted may be prevented from slipping. In the present embodiment, the non-slip unit (1110) may be arranged at any one of the pair of the pressing ends (27).

The non-slip unit (1100) may be arranged as a pair at both end portions of the non-slip unit (1110), and may be formed extendedly in a central direction at the both end portions of the non-slip unit (1100). The affixing portion (1120) may be inserted at the handle inserting inlet (24) and attach/link the non-slip unit (1110) at the clip body (20).

When the non-slip unit (1110) is inserted between the pair of the pressing ends (27), the affixing portion (1120) may be inserted at the handle inserting inlet (24). So as not to let the inserted affixing portion (1120) come out easily at the handle inserting inlet (24), the affixing portion (1120) may be formed to have a cross-sectional area larger than an inner cross-sectional area of the handle inserting inlet (24). The non-slip unit (1110) may be securely attached/linked at the clip body (20), as the affixing portion (1120) is insertedly attached/linked at the handle inserting inlet (24).

Accordingly, when a user uses the handles (30) to widen (e.g., spread or open up) the clip sides (21), the non-slip bands (1111) may widen as one with the clip side (21). And, when the clip sides (21) are narrowed or closed up by the elastic restoration force, the non-slip band(s) (1111) is pressed by the pressing end (27) of the clip side (21) and is/are narrowed, and the documents inserted may be effectively held/bound. At this time, the non-slip unit (1110) is formed in a material having frictional force as described, and between the non-slip band(s) (1111) which is/are pressed by the pressing ends (27), slipping of the documents is minimized and securely held. Here, the non-slip band (1111) may be extendedly formed to have a width larger than a width of the pressing end (27), so that contact area with the documents may be increased.

Meanwhile, when the non-slip band (1111) is pressed by the pressing end(s) (27), the affixing portion (1120) may be prevented from being released or getting out from the handle inserting inlet (24). That is, the affixing portion (1120) and the non-slip unit (1110) may interact and prevent each other from being released or getting out.

And, the affixing portion (1120) may have an inserting hole cap (1121). The inserting hole cap (1121) may be formed at an end portion of the affixing portion (1120), and may be formed to protrude more outward than the affixing portion (120). Thus, when the affixing portion (1120) is inserted at the handle inserting inlet (24), the inserting hole cap (1121) may be firmly held/fixed at an end portion of the handle inserting inlet (24). As the inserting hole cap (1121) is formed to protrude more outward than the affixing portion (1120), the clip device (10) may be prevented from coming into contact with the ground, surface or floor, and from slipping, and from injuring the user with the clip device's corner, edges.

Also, the inserting hole cap (1121) may function as a bumper which reduces noise and shock when the handle inserting inlet (24) comes in contact with the floor, and as such, it is preferable to form the inserting hole cap (1121) with a width to completely cover the handle inserting inlet (24), and with a thickness to sufficiently reduce the shock.

Meanwhile, when the non-slip unit (1110) disposed/located outward/outer side of the clip side (21) is formed with sufficient thickness, the non-slip unit (1110) may be laid between the handle(s) (30) and the clip side (21) and operate as a lever and thereby enable opening and closing of the clip device (10) while exerting comparatively less energy or strength—along with the functionality of preventing noise with the floor or slipping.

FIG. 15 is an exemplary diagram describing "a non-slip assembly for a clip device," in a state of being attached or linked to a clip device, according to a 5th embodiment of the present invention.

As shown in FIG. 15, the non-slip assembly for a clip device (1100) according to the present embodiment may be prepared in a plurality and all arranged at the pair of the pressing end (27), and other configurations may be same to the 4th embodiment described above.

When the non-slip unit (1110) are all arranged at the pair of the pressing end (27), both side/surfaces of the documents inserted may be pressed (down) tightly, and non-slip with respect to the documents may most certainly be realized.

FIG. 16 is a perspective-view diagram showing "a non-slip assembly for a clip device," in a state, attached or linked to a clip device, according to a 6th embodiment of the present invention. FIG. 17 is a perspective-view diagram showing "the non-slip assembly for a clip device" in a state, spread and flattened, according to the 6th embodiment of the present invention. FIG. 18 is a perspective-view detachment diagram of "the non-slip assembly for a clip device" in a state, detached from the clip device, according to the 6th embodiment of the present invention. FIG. 19 is a perspective-view diagram showing "the non-slip assembly for a clip device" in a state, attached or linked to the clip device and widened (e.g., opens up or spread apart), according to the 6th embodiment of the present invention. FIG. 20 is a side-view exemplary diagram showing "the non-slip assembly for a clip device" in a state, attached or linked to the clip device, according to the 6th embodiment of the present invention.

As shown in FIG. 16 to FIG. 20, the non-slip unit (1110) of the non-slip assembly for a clip device (1100) may be disposed along an outer side/surface of the clip body (20), and may have a body band (1113) and a connecting band (1114).

The body band (1113) and the connecting band (1114) may be formed in a sheet form (refer to FIG. 7), and in a flexible material having elasticity and frictional force. Accordingly, when the body band (1113) and the connecting band (1114) are attached/linked to the clip device (10), they may be arranged on an/the outer side/surface of the clip device (10) and have a shape corresponding (analogous) to the clip body (20). At each of the body band (1113), a pair of the non-slip band (1111) may be connected, corresponding to the pair of the pressing ends (27).

The body band (1113) may be formed as a pair, and when the non-slip unit (1110) is attached/linked at/on the clip body (20), the body band (1113) may be disposed so as to correspond to the clip side (21).

The connecting band (1114) may be a part which connects the pair of the body band (1113), and when referenced with respect to FIG. 7, the body band (1113) may be applicable to an upper part and lower part of the non-slip unit (1110), and the connecting band (1114) may be applicable to a central part of the non-slip unit (1110). When the non-slip unit (1110) is attached/linked to the clip body (20), the connecting band (1114) may be disposed so as to correspond to the connecting side (22).

Referencing FIG. 16 and FIG. 18 to describe a/the process of attaching or linking the non-slip assembly for a clip device (1100) to the clip device (10), The non-slip band (111) is disposed between the pressing ends (27) and operates as one with the pressing ends (27), and as such, the documents inserted into the insertion space (23) of the clip device (10) is inserted between the non-slip bands (1111) and may come in contact with the non-slip bands (1111). And, when the clip body (20) is narrowed, the non-slip bands may press (i.e., apply pressure to) both sides of the documents. As described above, as the non-slip unit (1110) is formed in a material having frictional force, slipping of the documents between the non-slip bands (1111), pressed by the pressing ends (27), may be minimized, and the documents may be securely held.

When the affixing portion (1120) is attached/linked at the handle inserting inlet (24), the body band (1113) may be disposed so as to correspond to the clip side (21), and the connecting band (1114) may be disposed so as to correspond to the connecting side (22). When the affixing portion (1120) is insertedly attached/linked at the handle inserting inlet (24), the non-slip unit (1110) and the clip body (20) may more securely operate as one. That is, as shown in FIG. 19, when the user uses the handles (30) to widen (e.g., spread or open up) the clip sides (21), the non-slip bands (1110) may widen as one with the pressing end(s) (27). And, when the clip sides (21) are narrowed or closed up by the elastic restoration force, the non-slip band(s) (1111) is pressed by the pressing end (27) of the clip side (21) and is/are narrowed, and the documents inserted may be effectively pressed and held/bound.

FIG. 21 is an exemplary diagram describing a/the connecting band and a/the holding protrusion of "the non-slip assembly for a clip device," according to the 6th embodiment of the present invention.

As shown in FIG. 21, a connecting band (1114*a*) may be formed to be longer than a width of the connecting side (22). If so, an insertion space (1115) for inserting the writing instrument (50) may be formed between an inner side/surface of the connecting band (1114*a*) and an outer side/surface of the connecting side (22); and the convenience in use may be increased thereby.

In addition, the non-slip unit (1110) may have held protrusion (1116). The holding protrusion (1116) may be protrudingly formed on an inner side/surface of the connecting band (1114) and may bend or curve when a/the writing instrument is inserted. The holding protrusion (1116) may be formed in more than one. When the non-slip unit (1110) is attached/linked to the clip device (10), the holding protrusion (1116) may protrude into the insertion space (1115). The holding protrusion (1116) may be formed to make a left-right pair, and may be disposed to face each other in the insertion space (1115). The holding protrusion (1116) may press (down) on the writing instrument (50) which is inserted into the insertion space (1115) and enable the writing instrument (50) to be more securely held.

FIG. 22 is an exemplary diagram describing other example(s) of a/the body band and the connecting band of "the non-slip assembly for a clip device," according to the 6th embodiment of the present invention.

As shown in FIG. 22, the connecting band (1114) may be formed with crinkles. That is, the connecting band (1114) may be formed to have a 1st crinkle (1131). When the writing instrument (50) is inserted between the connecting band (1114) and the connecting side (22), the 1st crinkle (1131) and the writing instrument (50) may be effectively pressed (i.e., pressure applied) to securely insert the writing instrument (50). Through this, a/the writing instrument may be inserted anywhere in a/the crinkle region where secure hold is possible, without being limited or restrained by a location/position or form of the writing instrument holding portion.

FIG. 23 is an exemplary diagram describing a 1st writing instrument holding portion of "the non-slip assembly for a clip device," according to the 6th embodiment of the present invention.

As shown in FIG. 23, the non-slip unit (1110) may have the 1st writing instrument holding portion (1140).

The 1st writing instrument holding portion (1140) may be formed extendedly on an end portion of the connecting band (1114), and may be formed in a same material as the non-slip unit (1110). The 1st writing instrument holding portion (114) may have a 1st holding hole (1141), which is penetratingly formed. The 1st writing instrument holding portion (1140) may be extendedly formed outward of the clip (device) body (20), and as such, in a state where the 1st writing instrument holding portion (1140) is bent downward, the writing instrument (50) may be inserted through the 1st holding hole (1141) toward the insertion space (23) of the clip device (10) and be securely held. Of course, in a state where the 1st writing instrument holding portion (1140) is bent upward, the writing instrument (50) may be inserted through the 1st holding hole (1141) and be securely held by bringing the writing instrument (50) in close proximity/contact with an outside (surface) of the connecting band (1114). Also, the 1st holding hole (1141) is not limited to the form of a hole, but may be formed in a form of a cross-shaped cutting line (1141*a*).

The 1st writing instrument holding portion (1140) may be formed on at least one side/of the body band (1113) among a pair of the body band (1113), as shown in FIG. 23(*b*). In such case, the 1st holding hole (1141) may be formed to further have a holding portion (1142), which is formed from a part of the 1st writing instrument holding portion (1140) which is turn is partially cut or cut off.

FIG. 24 is an exemplary diagram describing a 2nd writing instrument holding portion of "the non-slip assembly for a clip device," according to the 6th embodiment of the present invention.

As shown in FIG. 24, the non-slip unit (1110) may have a 2nd writing instrument holding portion (1150).

The 2nd writing instrument holding portion (1150) may be formed extendedly on both end portions (e.g., either side) of the connecting band (1114), and may have a 2nd holding hole (1151), which is penetratingly formed. That is, the 2nd writing instrument holding portion (1150) and the 1st writing instrument holding portion (1140) may be formed in a form of a left-right pair.

The 2nd writing instrument holding portion (1150) may be formed in a same material as the non-slip unit (1110), and as such, bending may be freely done. Accordingly, as in FIG. 24(*b*), by attaching/linking the writing instrument (50) in the 2nd holding hole (1151) in a state where the 2nd writing instrument holding portion (1150) is bent downward, the writing instrument (50) may be securely held. Of course, even here, by attaching/linking the writing instrument (50) in the 2nd holding hole (1151) in a state where the 2nd writing instrument holding portion (1150) is bent upward, the writing instrument (50) may be securely held.

The location/position of forming the 1st writing instrument holding portion (1140) and the 2nd writing instrument holding portion (1150) is not necessarily limited by the connecting band (1114), and the 1st writing instrument holding portion (1140) and the 2nd writing instrument holding portion (1150) may be formed on the body band (1113).

Meanwhile, the non-slip unit (1110) may have a linking portion. The linking portion may be arranged on at least one of the body band and the connecting band, and each of a plurality of the non-slip assembly for a clip device may be attached/linked to each other via the linking portion.

More particularly, FIG. 25 is an exemplary diagram describing a/the linking portion of "the non-slip assembly for a clip device," according to the 6th embodiment of the present invention.

As shown in FIG. 25, the linking portion (1160) may have a 1st linking member (1161) and a 2nd linking member (1162).

The 1st linking member (1161) may be arranged on the end portion of the connecting band (1114).

And, the 2nd linking member (1162) may be arranged at another/other end portion of the connecting band (1114), and may be attached/linked or separated from the 1st linking member (1161).

The linking portion (1160) of (the) each non-slip assembly for a clip device may be attached/linked to each other via the 1st linking member (1161) and the 2nd linking member (1162), and through this, a plurality of the non-slip assembly for a clip device may be attached/linked to each other. According to this, when a plurality of a clip device (10*a*, 10*b*), each holding documents, are in contact with each other yet stacked up, the clip device (10*a*, may not slip. Accordingly, relevant documents (e.g., document sets) may be attached/linked and carried and stored in a bound state. The 1st linking member (1161) and the 2nd linking member (1162) may be configured in various forms, including a button form, a fastener form, etc., and may be prepared in plurality. Also, the 1st linking member (1161) and the 2nd linking member (1162) may of course be arranged on the body band (1113).

FIG. 26 is an exemplary diagram describing another example of the linking portion of "the non-slip assembly for a clip device," according to the 6th embodiment of the present invention.

As shown in FIG. 26, the linking portion may have an extending portion (1163), a 3rd linking member (1164), and a 4th linking member (1165).

The extending portion (1163) may at its one end portion be connected to the body band (1113), and may be extendedly formed outward of the connecting side (22).

The 3rd linking member (1164) and the 4th linking member (1165) may be arranged on other end portion(s) of the extending portion (1163), and the 3rd linking member (1164) and the 4th linking member (1165) may be arranged in vicinity to each other. The 3rd linking member (1164) and the 4th linking member (1165) may form one pair, and may be capable of being attached/linked or detached from each other. The 3rd linking member (1164) and the 4th linking member (1165) may be configured in various forms, including a button form, a fastener form, etc., and may be prepared in plurality. And, the extending portion (1163) may be further configured at other end portion of the body band (1113).

Also, the linking portion may be formed in a combined form from the forms of the linking portions described in FIG. 25 and in FIG. 26. That is, the linking portion in the form described in FIG. 25 may be configured in one side of the non-slip unit, and the linking portion in the form described in FIG. 26 may be configured in other side of the non-slip unit; then, by making the described forms in FIG. 25 and FIG. 26 to be attached or be released from each other, a plurality of the non-slip assembly for a clip device may be attached/linked to each other.

The description of the present invention above is for exemplary and illustrative purposes, and a person having ordinary skill in the art will understand that the present invention may be easily altered or modified in other particular forms, without changing the technical spirit or essential characteristics of the present invention. Accordingly, the embodiments disclosed above must be understood to be exemplary in all aspects, and not limiting. For example, each element described as a singular form may be carried out in distributed/dispersed manner, and likewise, element described as distributed/dispersed may be carried out in a combined form.

The scope of the present invention is shown by the claims that follow, and it must be interpreted that all modifications or modified, altered forms derived from meaning, scope, and the equivalence principle of the claims are included in the scope of the present invention.

INDUSTRIAL APPLICABILITY

The present invention may securely hold/bind documents and the non-slip assembly for the clip device having various conveniences in use has industrial applicability in the relevant technical field.

The invention claimed is:

1. A non-slip assembly for a clip device, which is detachable from the clip device, the clip device comprising:

a clip device body having a pair of pressing ends, bendingly formed to have therein an insertion space in which documents are inserted therein, and presses the documents while being narrowed or closed up by elastic restoration force; and a pair of handles, linked to a handle inserting inlet formed on the clip device body, and pressed so that the clip device body is widened; and the non-slip assembly, comprising:

a non-slip unit, having a non-slip band, which is formed in a flexible material having elasticity and frictional force, and is arranged between the pair of the pressing ends to be in contact with the documents inserted in the insertion space, and is pressed by the pair of the pressing ends to prevent slipping with the documents inserted; and an affixing portion, which is disposed as a pair at a both-ends portion of the non-slip unit and inserted into the handle inserting inlet to attach the non-slip unit to the clip device body, wherein:

the clip device body comprises a clip side, which is formed as a pair, with the pressing end formed at an end portion thereon, and a connecting side, which connects the clip sides; and the non-slip unit, which is arranged along an inner side of the clip device body, comprises:

a pair of body bands, which is arranged to correspond to the clip sides, and connected to the pair of the non-slip bands, wherein the pair of the non-slip bands is arranged to correspond to the pair of the pressing ends; and a connecting band, which is arranged to correspond to the connecting side, and connects the body bands.

2. The non-slip assembly for a clip device according to claim 1, wherein the non-slip unit comprises a label holding portion, which is formed as a pair by cutting at a both-ends portion of at least any one of the body bands and the connecting band, and is closely attached at an outer surface of the clip device body for holding a label.

3. The non-slip assembly for a clip device according to claim 1, wherein the non-slip unit comprises a first writing instrument holding portion, which is extendedly formed at an end portion of at least any one of the body bands and the connecting band, and having a first holding hole, which is penetratingly formed and for holding a writing instrument inserted there-through.

4. The non-slip assembly for a clip device according to claim 1, wherein the non-slip unit comprises a second writing instrument holding portion, which is extendedly formed at a both-ends portion of any one of the body bands and the connecting band, and having a second holding hole, which is penetratingly formed and for holding a writing instrument inserted there-through.

5. The non-slip assembly for a clip device according to claim 1, wherein the non-slip unit comprises at least one holding protrusion, which is protrudingly formed on a surface of the body bands to support the documents, and with the connecting band, applies pressure on to hold the writing instrument.

6. A non-slip assembly for a clip device, which is detachable to the clip device, the clip device, comprising:

a clip device body having a pair of pressing end, which is bent to have therein an insertion space, in which documents are inserted therein, and which press the documents while being narrowed or closed up by elastic restoration force; and a pair of handle, which is linked to handle inserting inlet formed on the clip device body, and pressed so that the clip device body is widened; and the non-slip assembly, comprising:

a non-slip unit, which is formed in a flexible material having elasticity and frictional force, and is arranged between the pair of the pressing end to be in contact with the documents inserted in the insertion space, and is pressed by the pair of the pressing end to prevent slipping with the documents inserted; and an affixing portion, which is disposed as a pair at a both-ends portion of the non-slip unit, and inserted into the handle inserting inlet to attach the non-slip unit to the clip device body; and the non-slip unit comprises an insertion groove, which is formed by a cutting on the non-slip band so that the handle inserting inlet is inserted therethrough;

wherein when the handle inserting inlet is inserted through the insertion groove, the non-slip band is disposed and located between the pair of the pressing ends and operates as one with the pair of the pressing ends, wherein:

the clip device comprises a clip side, which is formed as a pair, with the pressing end formed at an end portion thereon, and a connecting side, which connects the clip sides; and the non-slip unit, which is arranged along an outer side of the clip device body, comprises:

a pair of body bands, which is arranged to correspond to the clip side, and connected to the pair of the non-slip band, wherein the pair of the non-slip bands is arranged to correspond to the pair of the pressing ends; and a connecting band, which is arranged to correspond to the connecting side, and connects the body bands.

7. The non-slip assembly for a clip device according to claim 6, wherein the connecting band is formed longer than a width of the connecting side, so that an inserting space for inserting a writing instrument is formed between an inner surface of the connecting band and an outer surface of the connecting side.

8. The non-slip assembly for a clip device according to claim 7, wherein the non-slip unit comprises at least one holding protrusion, which is protrudingly formed on the inner surface of the connecting band, and applies pressure on to hold the writing instrument inserted into the inserting space.

9. The non-slip assembly for a clip device according to claim 6, wherein the non-slip unit comprises a first writing instrument holding portion, which is extendedly formed at an end portion of the connecting band, and having a first holding hole, which is penetratingly formed and for holding a writing instrument inserted there-through.

10. The non-slip assembly for a clip device according to claim 6, wherein:

the non-slip unit comprises a linking portion, which is arranged on at least one of the body bands and the connecting band; and each of the plurality of the non-slip assembly for a clip device is linked to each other via the linking portion.

11. The non-slip assembly for a clip device according to claim 6, wherein the connecting band is formed with a crinkle.

12. The non-slip assembly for a clip device according to claim 6, wherein the affixing portion comprises an inserting hole cap, which is formed on a portion of the affixing portion to protrude more outwardly than the affixing portion, and is closely attached at the handle inserting inlet.

* * * * *